United States Patent
Bloch et al.

(10) Patent No.: US 10,702,993 B2
(45) Date of Patent: Jul. 7, 2020

(54) END EFFECTORS HAVING COMPACTION FEET FOR WELDING THERMOPLASTIC PARTS

(71) Applicant: The Boeing Company, Chicago, IL (US)

(72) Inventors: Daniel David Bloch, Saint Peters, MO (US); Zachary Green, Edwardsville, IL (US); John Emil Larson, O'Fallon, MO (US); Eric E. Moyes, Desoto, MO (US); Randall D. Wilkerson, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 16/028,150

(22) Filed: Jul. 5, 2018

(65) Prior Publication Data

US 2020/0009743 A1    Jan. 9, 2020

(51) Int. Cl.
| | |
|---|---|
| *B25J 15/00* | (2006.01) |
| *B29C 70/38* | (2006.01) |
| *B29C 65/02* | (2006.01) |
| *B25J 11/00* | (2006.01) |
| *B25J 15/06* | (2006.01) |
| *B29C 65/08* | (2006.01) |

(52) U.S. Cl.
CPC ......... *B25J 15/0066* (2013.01); *B25J 11/005* (2013.01); *B25J 15/0019* (2013.01); *B25J 15/0691* (2013.01); *B29C 65/022* (2013.01); *B29C 70/38* (2013.01); *B29C 65/08* (2013.01); *Y10S 901/42* (2013.01)

(58) Field of Classification Search
CPC ..... Y10S 901/42; B25J 15/0019; B29C 65/08
USPC .......................................................... 901/42
See application file for complete search history.

(56) References Cited

U.S. PATENT DOCUMENTS

2013/0263999 A1* 10/2013 Weiland .............. B29C 66/8161
                                                          156/73.1

FOREIGN PATENT DOCUMENTS

| EP | 2647463 | 10/2013 |
|---|---|---|
| EP | 2845701 | 3/2015 |

OTHER PUBLICATIONS

European Patent Office, "Extended European Search Report," issued in connection with European Patent Application No. 18163928.7, dated Sep. 20, 2018, 9 pages.

* cited by examiner

*Primary Examiner* — Carson Gross
(74) *Attorney, Agent, or Firm* — Hanley, Flight & Zimmerman, LLC

(57) ABSTRACT

End effectors having compaction feet for welding thermoplastic parts of thermoplastic composite laminated articles are described. An example end effector is to be coupled to a robot. The end effector includes a welding head. The welding head includes a welder having a first central axis and a compaction foot having a second central axis. The welder is movable along the first central axis between a first retracted position and a first extended position relative to a surface of the end effector. The compaction foot circumscribes the welder and is movable along the second central axis between a second retracted position and a second extended position relative to the surface.

20 Claims, 15 Drawing Sheets

END EFFECTORS HAVING COMPACTION FEET FOR WELDING THERMOPLASTIC PARTS

FIELD OF THE DISCLOSURE

This disclosure relates generally to end effectors used to fabricate thermoplastic composite laminated articles and, more specifically, to end effectors having compaction feet for welding thermoplastic parts of thermoplastic composite laminated articles.

BACKGROUND

Conventional methods of assembling thermoplastic composite laminated articles and/or thermoplastic composite layups require a substantial degree of manual labor and/or human involvement in conjunction with performing various aspects, steps and/or stages of the assembly process. For example, such conventional methods commonly require that one or more thermoplastic part(s) (e.g., one or more thermoplastic prepreg part(s)) to be incorporated into a thermoplastic composite laminated article be picked up, moved, placed, stacked and/or laid up manually prior to such individual thermoplastic parts being welded (e.g., tack welded) to one another in connection with forming the thermoplastic composite laminated article. Human involvement in the picking up, placing, stacking, laying up and/or welding aspects of such conventional methods limits the accuracy, efficiency, and repeatability of the assembly process.

SUMMARY

End effectors having compaction feet for welding thermoplastic parts of thermoplastic composite laminated articles are disclosed. In some examples, an end effector to be coupled to a robot is disclosed. In some disclosed examples, the end effector comprises a welding head. In some disclosed examples, the welding head includes a welder having a first central axis and a compaction foot having a second central axis. In some disclosed examples, the welder is movable along the first central axis between a first retracted position and a first extended position relative to a surface of the end effector. In some disclosed examples, the compaction foot circumscribes the welder and is movable along the second central axis between a second retracted position and a second extended position relative to the surface.

In some examples, an end effector to be coupled to a robot is disclosed. In some disclosed examples, the end effector comprises a welding head. In some disclosed examples, the welding head includes a welder and a nozzle. In some disclosed examples, the welder has a central axis and is movable along the central axis between a retracted position and an extended position relative to a vacuum surface of a vacuum head of the end effector. In some disclosed examples, the nozzle is to direct a flow of cooling air toward a welding tip of the welder.

In some examples, a method for welding a first thermoplastic part to a second thermoplastic part via a welding head of an end effector coupled to a robot is disclosed. In some disclosed examples, the method comprises positioning the first thermoplastic part against the second thermoplastic part. In some disclosed examples, the method comprises positioning a surface of the end effector toward the first thermoplastic part. In some disclosed examples, the welding head includes a welder having a first central axis and a compaction foot having a second central axis. In some disclosed examples, the welder is movable along the first central axis between a first retracted position and a first extended position relative to the surface. In some disclosed examples, the compaction foot circumscribes the welder and is movable along the second central axis between a second retracted position and a second extended position relative to the surface. In some disclosed examples, the method comprises compacting a first area of the first thermoplastic part and a second area of the second thermoplastic part by moving the compaction foot from the second retracted position to the second extended position. In some disclosed examples, the method comprises moving the welder from the first retracted position to the first extend position. In some disclosed examples, the method comprises welding, via a welding tip of the welder, a first portion of the first thermoplastic part located within the first area to a second portion of the second thermoplastic part located within the second area. In some disclosed examples of the method, the welding is to occur while the welder is in the first extended position and the compaction foot is in the second extended position.

BRIEF DESCRIPTION OF THE DRAWINGS

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Figure 1:
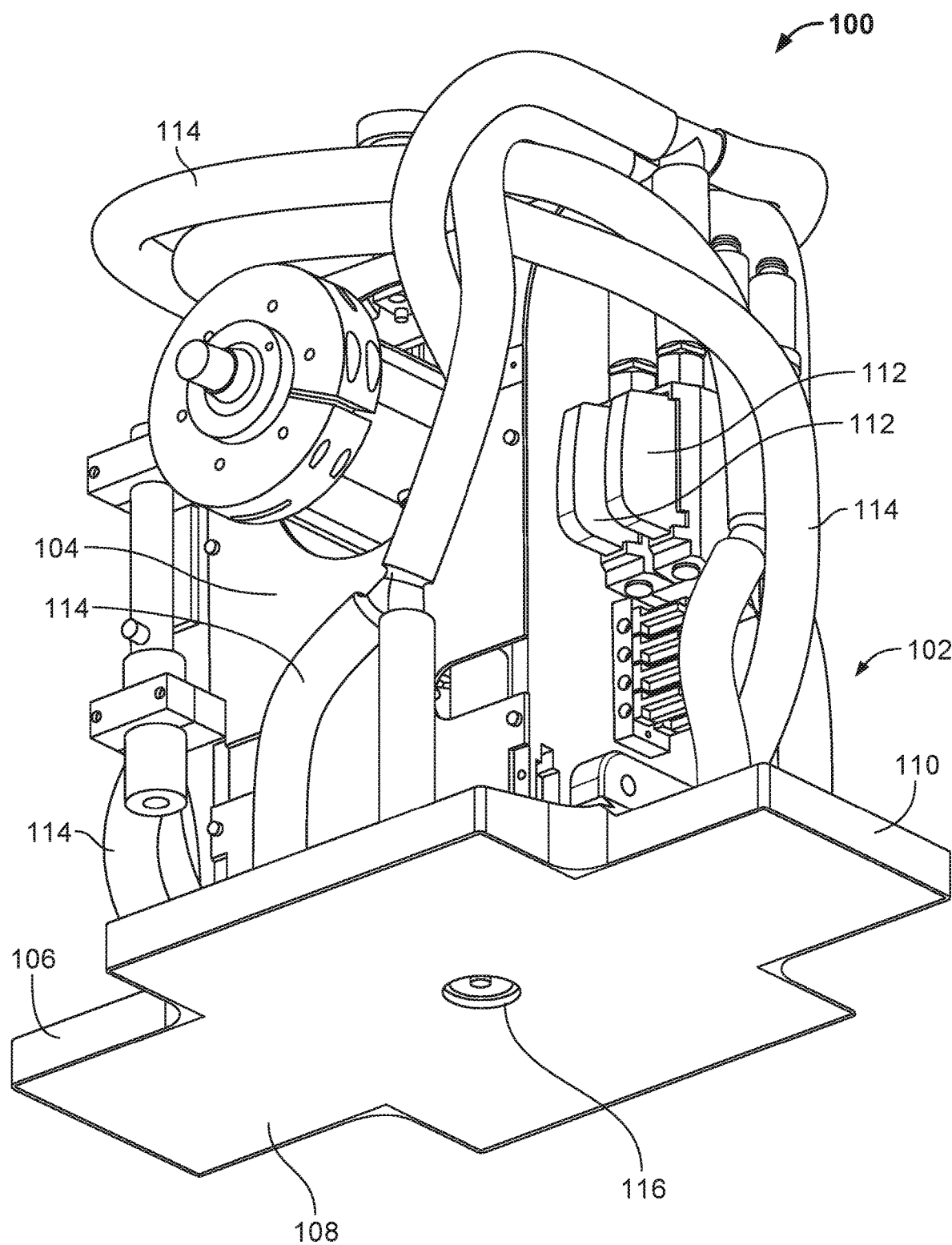
FIG. 1 is a first perspective view of an example end effector constructed in accordance with the teachings of this disclosure and shown in a first example configuration.

As used herein, the term "thermoplastic part" refers to a thermoplastic material (e.g., one or more sheets, plies, or layers of thermoplastic material) to be incorporated into a thermoplastic composite laminated article. A thermoplastic part can be, for example, one or more sheets of fiber pre-impregnated with thermoplastic resin (e.g., prepreg). The fiber can be formed, for example, from carbon, fiberglass, or Kevlar. The fiber can be unidirectional, or can alternatively be a multidirectional weave or fabric. As used herein, the term "thermoplastic composite laminated article" refers generally to any thermoplastic article including at least two thermoplastic parts that have been welded (e.g., tack welded) to one another to form the thermoplastic composite laminated article. Further processing, for example through the application of heat and pressure, of the thermoplastic composite laminated article creates a thermoplastic composite structure. The end use of the thermoplastic composite structure determines the specific configuration (e.g., number of sheets, size and shape of sheets, or relative orientation of adjacent sheets) of the thermoplastic parts in the thermoplastic composite laminated article.

As discussed above, conventional methods of assembling thermoplastic composite laminated articles commonly require that one or more thermoplastic part(s) (e.g., one or more thermoplastic prepreg part(s)) to be incorporated into a thermoplastic composite laminated article be picked up, moved, placed, stacked and/or laid up manually prior to such individual thermoplastic parts being welded to one another to form the thermoplastic composite laminated article. Human involvement in the picking up, placing, stacking, laying up and/or welding aspects of such conventional methods limits the accuracy, efficiency, and repeatability of the assembly process. Automated methods utilizing a robotic end effector having a vacuum head configured to pick up, place, stack and/or lay up one or more thermoplastic part(s) of a thermoplastic composite laminated article, and a welding head configured to weld together various thermoplastic parts to form the thermoplastic composite laminated article, are described in U.S. patent application Ser. No. 15/484,721 entitled "Multifunction End Effector Apparatus and Methods for Assembling Thermoplastic Composite Articles" filed on Apr. 11, 2017. Such automated methods greatly improve the accuracy, efficiency, and repeatability of the assembly process.

When utilizing a robotic end effector to build up a thermoplastic composite laminated article or layup, it is common that the layup will include a stack of various-sized thermoplastic parts (e.g., various-sized thermoplastic plies). As the layup builds up, the cross-section of the layup commonly becomes inconsistent in height. For example, as the layup builds up, ply drops (e.g., progressively smaller thermoplastic plies stacked on each other) can lead to a significant taper and/or angle along the surface of the layup. As the layup gets thicker, the bulk (e.g., squishiness or yield to the touch) of the layup also tends to increase due at least in part to trapped air between the layers of the thermoplastic parts. Significant tapers and/or bulk of the layup make it difficult to weld additional thermoplastic parts (e.g., additional thermoplastic plies) onto the layup, and often reduce the likelihood of the weld holding when the welding tip of the end effector is released. In some instances, the taper and/or the bulk of the layup can cause the weld to fail and/or break when the welding tip of the end effector is released, particularly if the welding tip of the end effector is released before the thermoplastic parts being welded together have cooled to a temperature below their melting points.

Example end effectors disclosed herein include compaction feet for welding thermoplastic parts of thermoplastic composite laminated articles. More specifically, the disclosed end effectors include a welder that is movable between a first retracted position and a first extended position relative to a surface (e.g., a vacuum surface) of the end effector, and a compaction foot that circumscribes the welder and is movable between a second retracted position and a second extended position relative to the surface of the end effector.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

As used herein in the context of describing various positions of the welder and/or of the compaction foot, the terms "retracted position" and "extended position" are relative in nature. For example, describing the welder as being in a retracted position relative to a surface and/or relative to another structure does not necessarily mean that the welder is in a fully-retracted position. Similarly, describing the welder as being in an extended position relative to a surface and/or relative to another structure does not necessarily mean that the welder is in a fully-extended position. In this same light, describing the compaction foot as being in a retracted position relative to another surface and/or relative to a structure does not necessarily mean that the compaction foot is in a fully-retracted position. And similarly, describing the compaction foot as being in an extended position relative to a surface and/or relative to another structure does not necessarily mean that the compaction foot is in a fully-extended position.

The welder and the compaction foot of the disclosed end effectors are movable independently of and/or relative to one another. The compaction foot of the disclosed end effectors can advantageously be moved from the second retracted position to the second extended position to compact and/or debulk an area of a layup prior to a first thermoplastic part of the layup being welded to a second thermoplastic part of the layup. While the compaction foot is compacting and/or debulking the area of the layup, the welder can be moved from the first retracted position to the first extended position to weld (e.g., tack weld) a portion of the first thermoplastic part located within the compacted and/or debulked area to a portion of the second thermoplastic part located within the compacted and/or debulked area. Following completion of the weld, the welder can advantageously return from the first extended position to the first retracted position while the compaction foot remains in the second extended position to continue compacting and/or debulking the welded thermoplastic parts. With the compaction foot in its second extended position, the weld applied to the first and second thermoplastic parts accordingly has an opportunity to cool without the need of the first and second thermoplastic parts being held together by the force of the welding tip of the welder. Cooling of the weld via the disclosed end effectors accordingly improves the likelihood of the weld being successful, and/or reduces the likelihood of the weld failing or breaking. In some disclosed examples, the cooling of the weld is enhanced and/or alternatively implemented by directing a flow of cooling air toward the welding tip of the welder via the end effector in connection with the welding process. In some disclosed examples, the flow of cooling air is directed toward a weld that has been applied to the first and second thermoplastic parts, and/or is directed toward the portion(s) of the first and second thermoplastic parts surrounding the weld.

Figure 2:
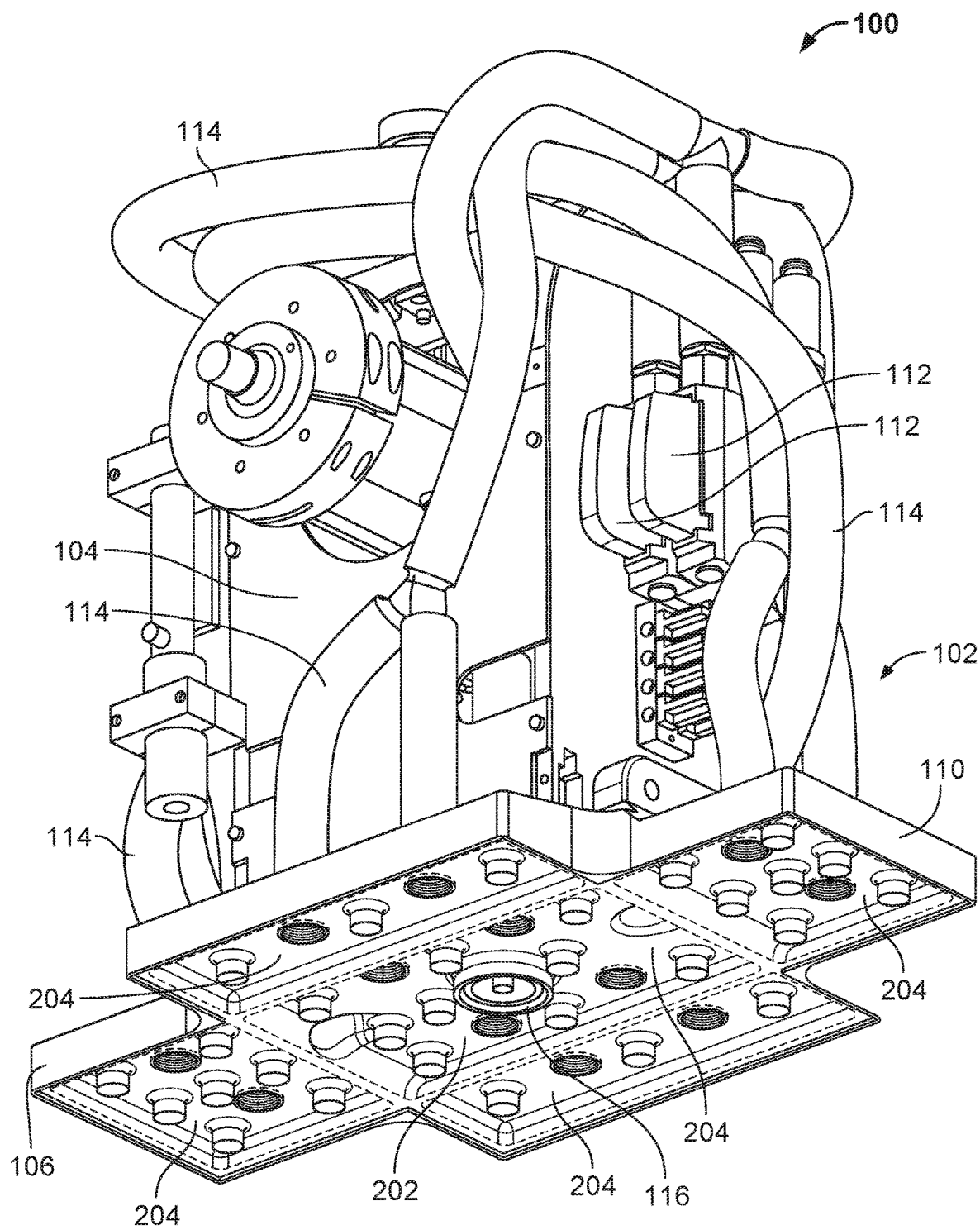
FIG. 2 is a second perspective view of the end effector of FIG. 1 shown in the first configuration of FIG. 1, and with the example vacuum surface shown in FIG. 1 omitted.
Figure 3:
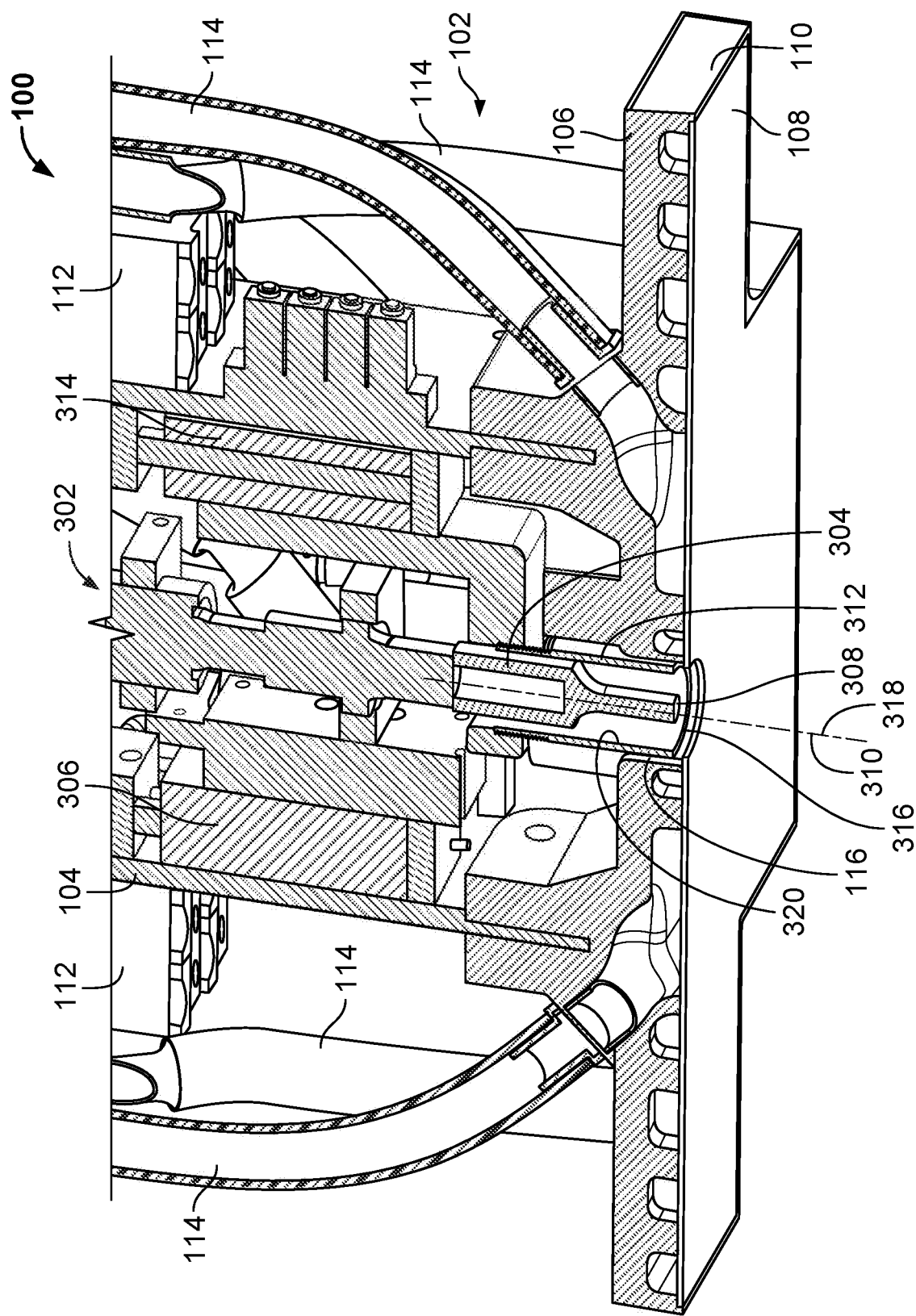
FIG. 3 is a first cross-sectional view of the end effector of FIGS. 1 and 2 shown in the first configuration of FIGS. 1 and 2.
Figure 4:
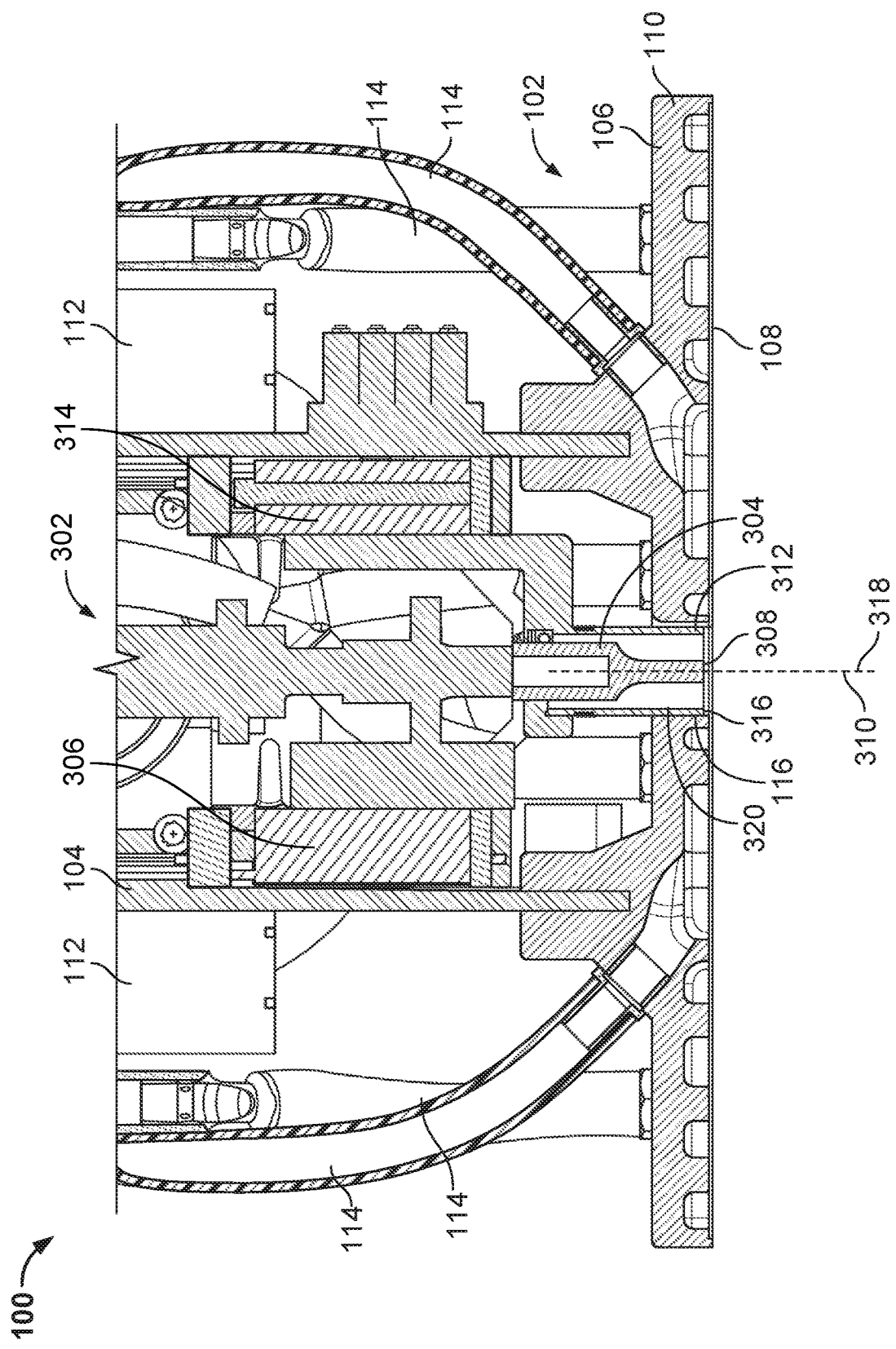
FIG. 4 is a second cross-sectional view of the end effector of FIGS. 1-3 shown in the first configuration of FIGS. 1-3.
Figure 5:
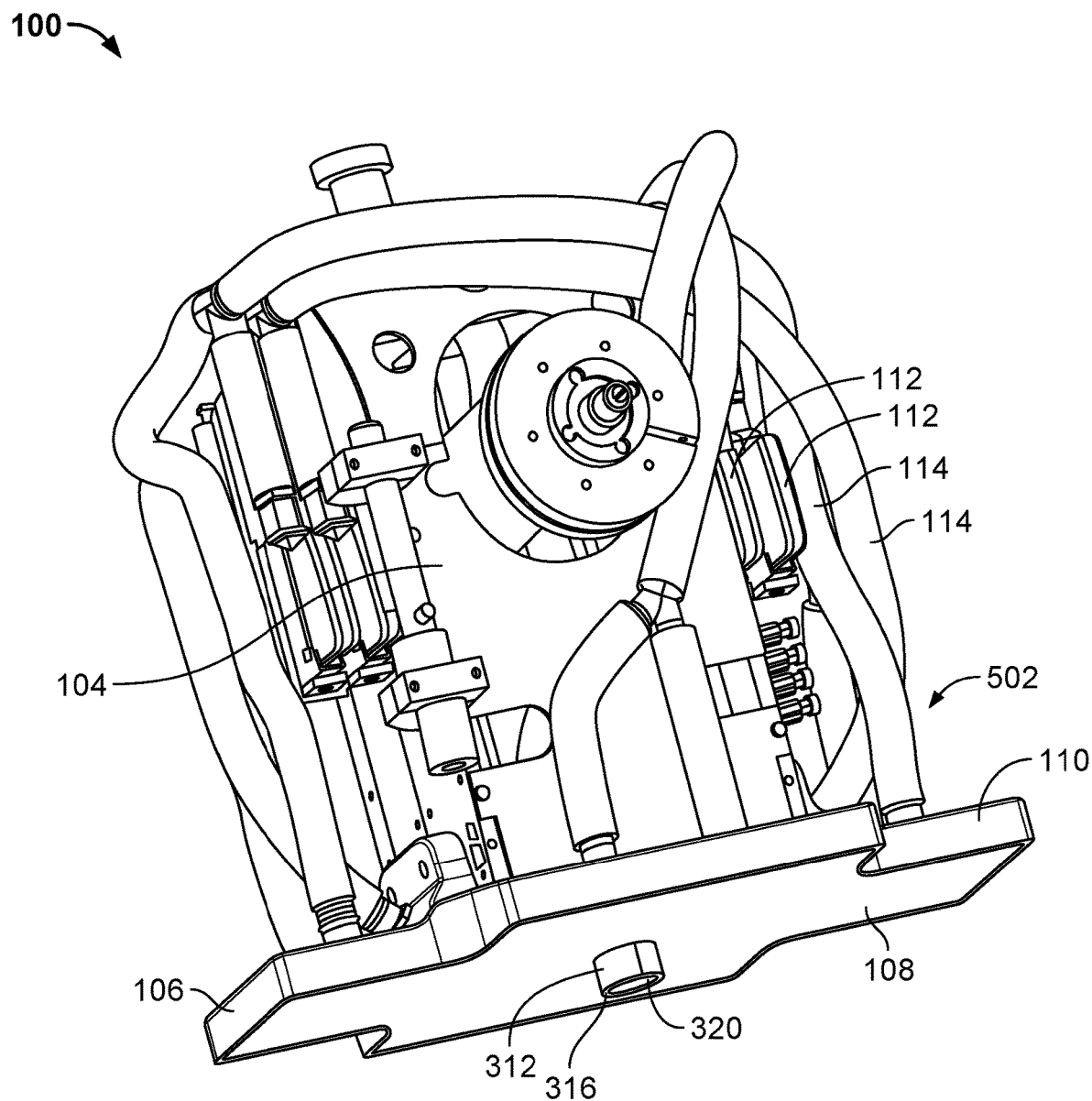
FIG. 5 is a third perspective view of the end effector of FIGS. 1-4 shown in a second example configuration.
Figure 6:
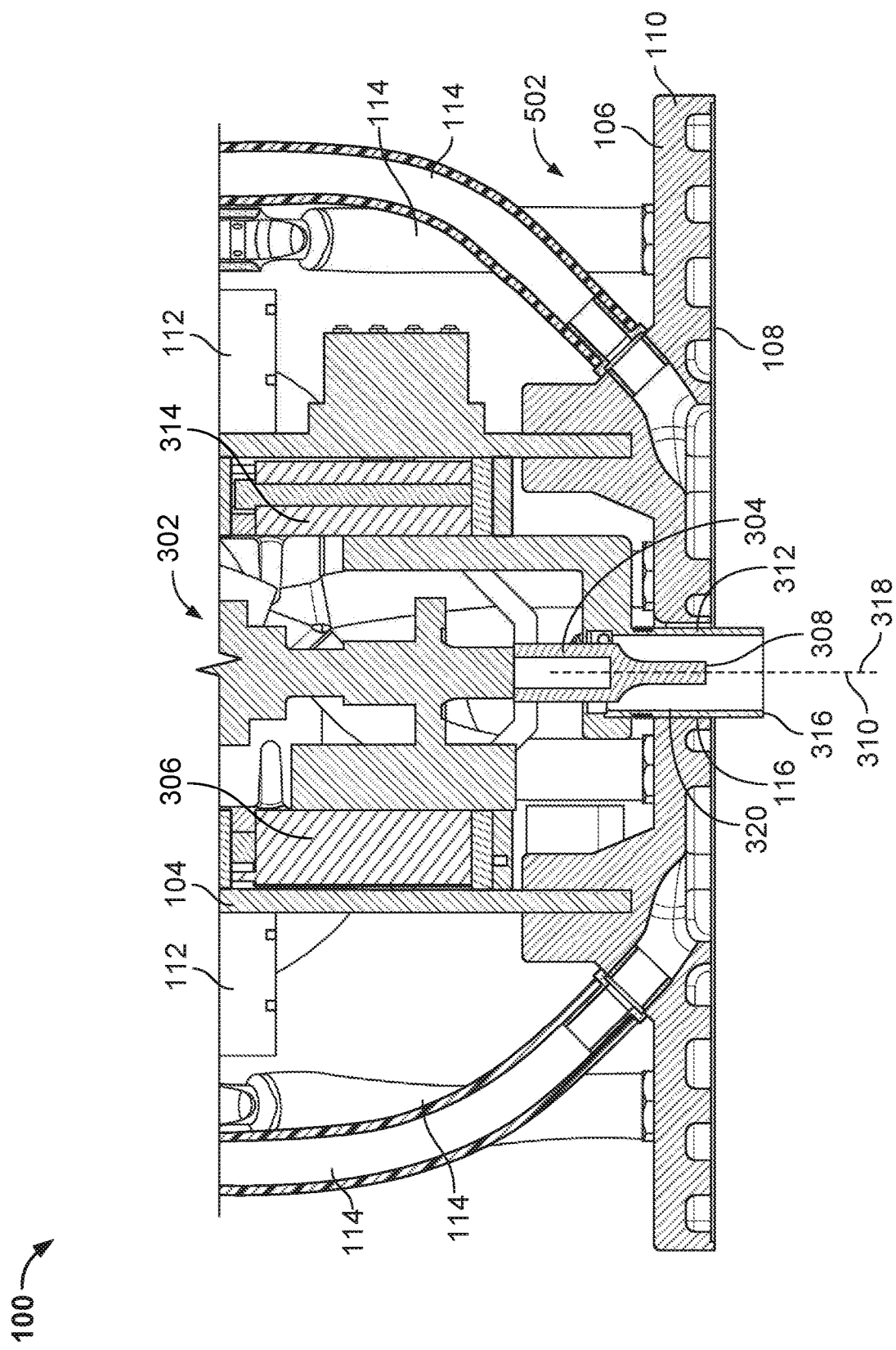
FIG. 6 is a third cross-sectional view of the end effector of FIGS. 1-5 shown in the second configuration of FIG. 5.
Figure 7:
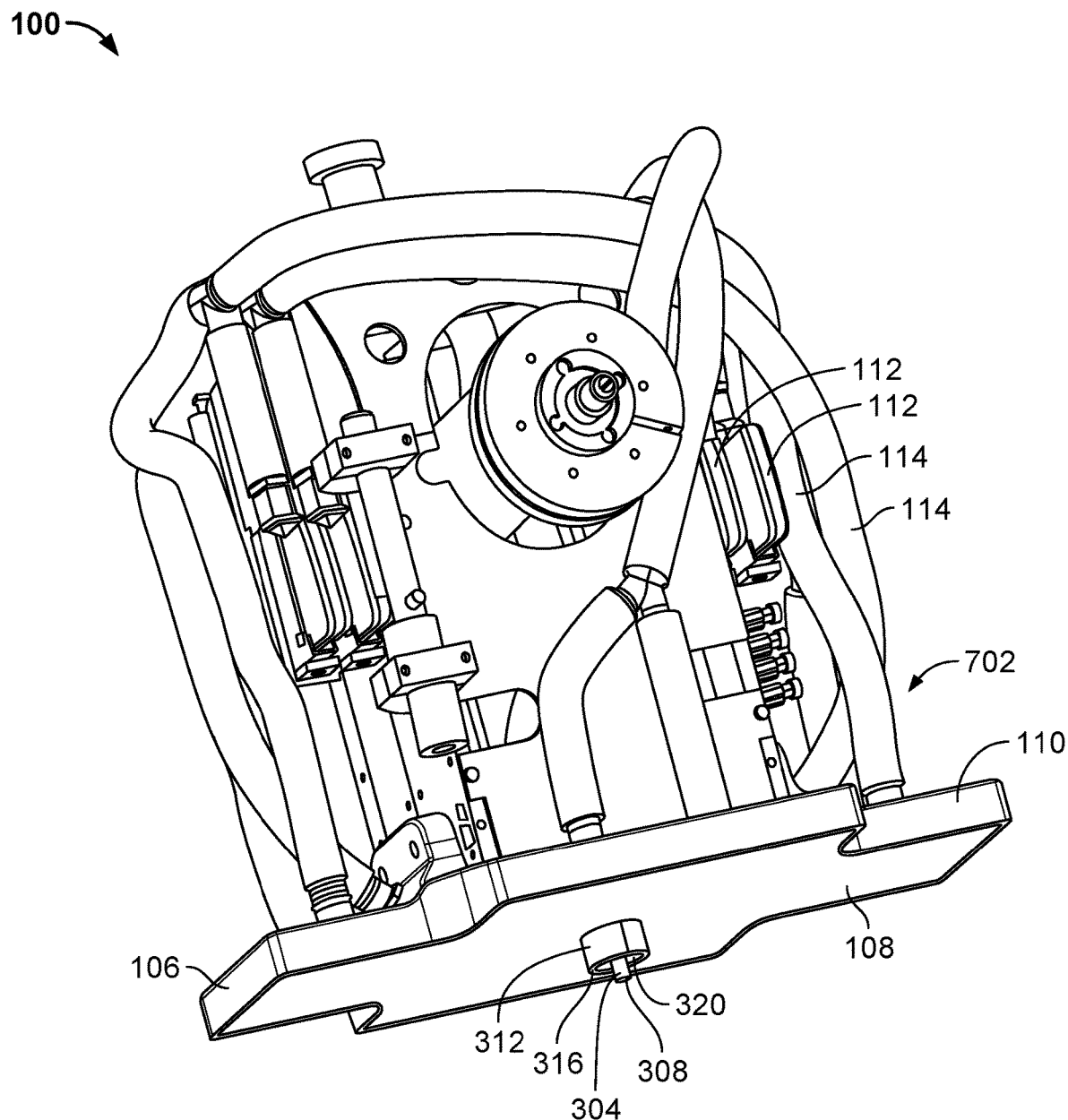
FIG. 7 is a fourth perspective view of the end effector of FIGS. 1-6 shown in a third example configuration.
Figure 8:
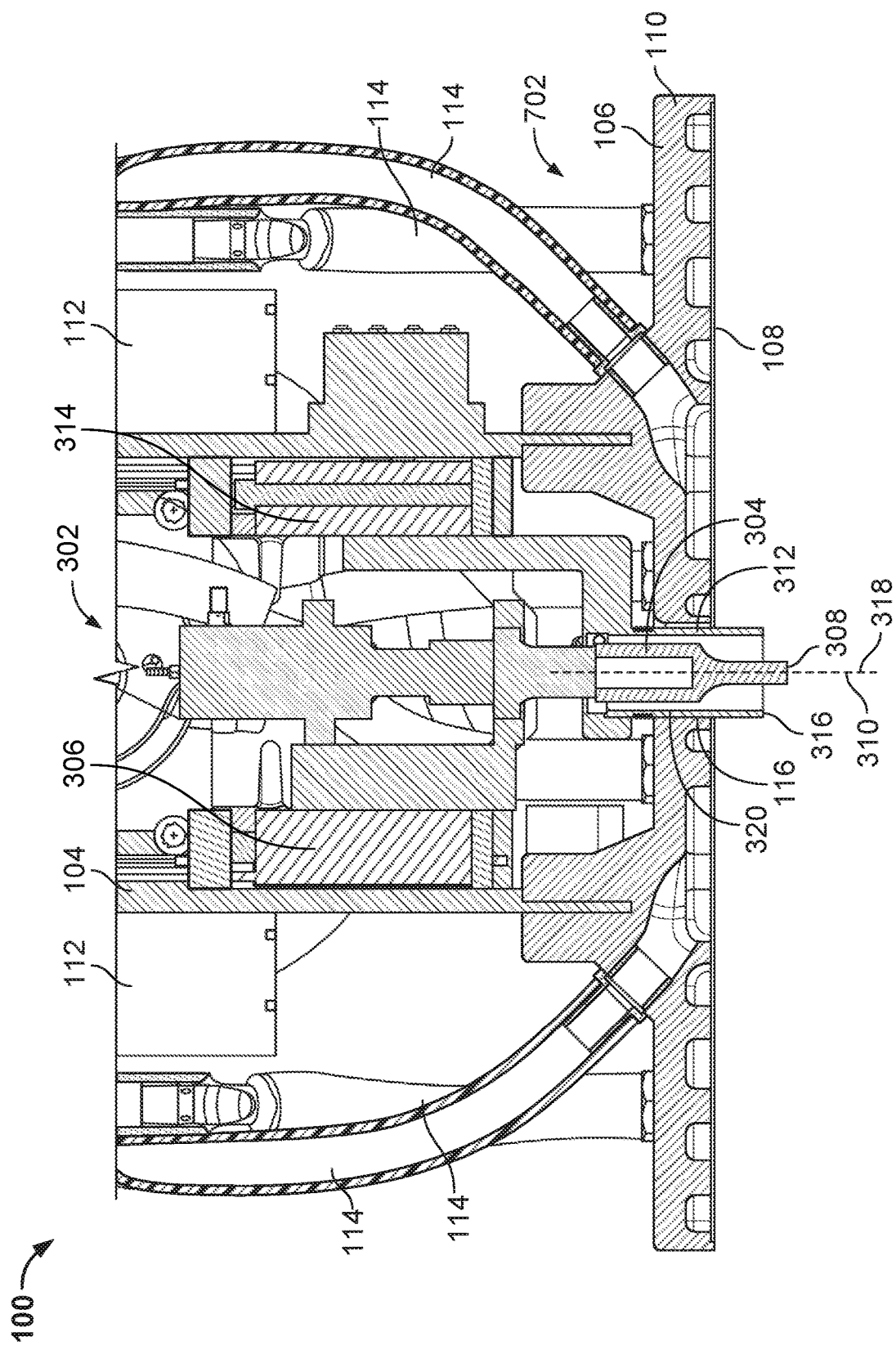
FIG. 8 is a fourth cross-sectional view of the end effector of FIGS. 1-7 shown in the third configuration of FIG. 7.

FIG. 1 is a first perspective view of an example end effector 100 constructed in accordance with the teachings of this disclosure and shown in a first example configuration 102. FIG. 2 is a second perspective view of the end effector 100 of FIG. 1 shown in the first configuration 102 of FIG. 1, and with an example vacuum surface shown in FIG. 1 omitted. FIG. 3 is a first cross-sectional view of the end effector 100 of FIGS. 1 and 2 shown in the first configuration 102 of FIGS. 1 and 2. FIG. 4 is a second cross-sectional view of the end effector 100 of FIGS. 1-3 shown in the first configuration 102 of FIGS. 1-3. FIG. 5 is a third perspective view of the end effector 100 of FIGS. 1-4 shown in a second example configuration 502. FIG. 6 is a third cross-sectional view of the end effector 100 of FIGS. 1-5 shown in the second configuration 502 of FIG. 5. FIG. 7 is a fourth perspective view of the end effector 100 of FIGS. 1-6 shown in a third example configuration 702. FIG. 8 is a fourth cross-sectional view of the end effector 100 of FIGS. 1-7 shown in the third configuration 702 of FIG. 7.

The end effector 100 of FIGS. 1-8 includes an example frame 104 and an example vacuum head 106. In the illustrated example of FIGS. 1-8, the vacuum head 106 is coupled (e.g., fixedly or rigidly coupled) to the frame 104 of the end effector 100. The end effector 100 of FIGS. 1-8 can be coupled to a robot. For example, the frame 104 of the end effector 100 can be coupled to a movable frame and/or axis of a robot such that movements of the frame and/or axis of the robot are transferred and/or conveyed to the frame 104 of the end effector 100 and/or, more generally to the end effector 100 as a whole. In some examples, the robot can be a jointed arm six-axis robot capable of moving (e.g., translating, rotating, etc.) the end effector 100 of FIGS. 1-8 into various positions and/or locations within an environment of use. In other examples, the robot can be of a different type, structure and/or configuration capable of moving the end effector 100 of FIGS. 1-8 into various positions and/or locations within an environment of use.

In the illustrated example of FIGS. 1 and 3-8, the vacuum head 106 of the end effector 100 includes an example vacuum surface 108 located at and/or extending across an example vacuum end 110 of the vacuum head 106. FIG. 2 shows the end effector 100 of FIGS. 1 and 3-8 with the vacuum surface 108 of the end effector 100 removed. In some examples, the vacuum surface 108 of FIGS. 1 and 3-8 can be a porous plastic covering that covers an example vacuum area 202 of the vacuum head 106, as shown in FIG. 2. The vacuum surface 108 of FIGS. 1 and 3-8 is structured and/or configured to selectively face toward (e.g., based on the position of the frame 104 of the end effector 100 as controlled by the robot), be positioned against, and/or be positioned in contact with a thermoplastic part to be picked up by the vacuum head 106 of the end effector 100. In the illustrated example of FIGS. 1 and 3-8, the vacuum surface 108 of the vacuum head 106 is substantially flat and/or planar. In other examples, the vacuum surface 108 of the vacuum head 106 can alternatively be curved (e.g., non-planar), contoured, or otherwise shaped to support and/or complement an associated geometry of a thermoplastic composite laminated article to be fabricated by the end effector 100.

The vacuum surface 108 and/or the vacuum area 202 of FIGS. 1-8 is/are operatively coupled to (e.g., in fluid communication with) one or more example vacuum generator(s) 112 of the end effector 100. For example, each vacuum generator 112 can be operatively coupled to the vacuum surface 108 and/or to the vacuum area 202 via one or more example conduit(s) 114. Each vacuum generator 112 is structured and/or configured to generate a corresponding vacuum force to be applied at the vacuum surface 108 and/or at the vacuum area 202. The vacuum surface 108 and/or, more generally, the vacuum head 106 of FIGS. 1-8 is/are structured and/or configured to pick up and/or hold one or more thermoplastic part(s), or one or more portion(s) thereof, in response to the vacuum force(s) applied at the vacuum surface 108 and/or at the vacuum area 202 of the vacuum head 106.

In some examples, the vacuum area 202 of the vacuum head 106 of FIGS. 1-8 can be segmented into a plurality of example vacuum zones 204, as shown in FIG. 2. In such examples, respective ones of the vacuum forces can selectively be applied to respective ones of the vacuum zones 204. The selective application of one or more of the vacuum force(s) at one or more of the vacuum zone(s) 204 of the vacuum area 202 enables one or more desired portion(s) of the vacuum surface 108 of the vacuum head 106 to pick up and/or hold one or more thermoplastic part(s), or one or more portion(s) thereof.

In the illustrated example of FIGS. 1-8, the vacuum head 106 of the end effector 100 includes a first example aperture 116 extending through the vacuum surface 108 and the vacuum area 202 of the vacuum head 106. In the illustrated example of FIGS. 1-8, the first aperture 116 has a circular cross-sectional shape and/or area. In other examples, the first aperture 116 can have a different cross-sectional shape and/or area (e.g., a non-circular cross-sectional shape and/or area, a differently sized cross-sectional shape and/or area, etc.). As further described herein, portions of components of a welding head of the end effector 100 of FIGS. 1-8 can be positioned and/or located within the first aperture 116 of the vacuum head 106 such that the vacuum head 106 circumscribes such portions of the components of the welding head. In such examples, the first aperture 116 of the vacuum head 106 of FIGS. 1-8 enables the portions of the components of a welding head of the end effector 100 of FIGS. 1-8 to move between a retracted position relative to the vacuum surface 108 of the vacuum head 106 of the end effector 100 (e.g., a position in which the operational end(s) of the portion(s) of the component(s) of the welding head are located within the first aperture 116) and an extended position relative to the vacuum surface 108 of the vacuum head 106 of the end effector 100 (e.g., a position in which the operational end(s) of the portion(s) of the component(s) of the welding head are located outside of the first aperture 116).

The end effector 100 of FIGS. 1-8 includes an example welding head 302 having an example welder 304. The welder 304 of FIGS. 1-8 is configured and/or structured to weld (e.g., tack weld) one thermoplastic part to another thermoplastic part (e.g. to form a thermoplastic composite laminated article or layup). In some examples, the welder 304 can be coupled to the welding head 302 and/or the frame 104 of the end effector 100 of FIGS. 1-8 in a pressurized and/or spring-loaded manner that causes movement of the welder 304 relative to the welding head 302 and/or the frame 104 of the end effector 100. For example, the welder 304 of FIGS. 1-8 is coupled to a first example air cylinder 306 that causes movement of the welder 304 relative to the welding head 302 and/or the frame 104 of the end effector 100. In some examples, movement of the welder 304 relative to the welding head 302 and/or the frame 104 via the first air cylinder 306 enables the pressure and/or the force at which the welder 304 operates (e.g., the pressure and/or the force at which the welder 304 welds a first thermoplastic part to a second thermoplastic part) to be controlled and/or adjusted depending upon material and/or specification requirements associated with the welding operation to be performed. The period of time (e.g., the duration) for which the welder 304 remains in any particular position (e.g., any retracted position or any extended position) can also be controlled and/or adjusted via the first air cylinder 306.

In some examples, the welder 304 of FIGS. 1-8 can be implemented as an ultrasonic welder that is powered, controlled and/or operated by an ultrasonic power supply. The ultrasonic power supply can be mounted on the end effector 100 of FIGS. 1-8. The ultrasonic power supply can alternatively be mounted on the robot to which the end effector 100 of FIGS. 1-8 is coupled. The ultrasonic power supply can also alternatively be located remotely from both the end effector 100 of FIGS. 1-8 and the robot to which the end effector 100 is coupled. In some examples, the ultrasonic power supply is adjustable such that the welder 304 of FIGS. 1-8 can operate at different (e.g., adjustable) power settings depending upon material and/or specification requirements associated with the welding operation to be performed.

The welder 304 of FIGS. 1-8 includes an example welding tip 308, and has a first example central axis 310. The welding tip 308 and/or, more generally, the welder 304 of FIGS. 1-8 is/are movable along the first central axis 310 between a first retracted position of the welder 304 and a first extended position of the welder 304. In some examples, movement of the welding tip 308 and/or the welder 304 occur(s) relative to the vacuum surface 108 of the vacuum head 106 of the end effector 100 of FIGS. 1-8. For example, the welding tip 308 and/or, more generally, the welder 304 of FIGS. 1-8 can be moved, along the first central axis 310, from the first example retracted position of the welder 304 associated with the first configuration 102 of the end effector 100 shown in FIGS. 1-4 (e.g., a position in which the welding tip 308 of the welder 304 is located within the first aperture 116 of the vacuum head 106) to a first example extended position of the welder 304 associated with the third configuration 702 of the end effector 100 shown in FIGS. 7 and 8 (e.g., a position in which the welding tip 308 of the welder 304 is located outside of the first aperture 116 of the vacuum head 106).

The welding tip 308 and/or, more generally, the welder 304 can be moved along the first central axis 310 from and/or into a variety of different retracted positions and extended positions. In other words, the welding tip 308 and/or the welder 304 can have variable and/or adjustable retracted positions and variable and/or adjustable extended positions. For example, the extended position of the welding tip 308 and/or the welder 304 may vary based on the extent and/or degree of extension that may be required of the welding tip 308 and/or the welder 304 to weld (e.g., tack weld) a first thermoplastic part of a stack of thermoplastic parts to a second thermoplastic part of the stack of thermoplastic part.

In some examples, the welding tip 308 of the welder 304 of FIGS. 1-8 extends from within the first aperture 116 of the vacuum head 106 and past the vacuum surface 108 of the vacuum head 106 when the welder 304 moves along the first central axis 310 from the first example retracted position of the welder 304 (e.g., as shown in FIG. 4) to the first example extended position of the welder 304 (e.g., as shown in FIG. 8). As a result, the welding tip 308 of the welder 304 can weld a first thermoplastic part to a second thermoplastic part. In some examples, the welding tip 308 of the welder 304 can weld the first thermoplastic part to the second thermoplastic part while the vacuum surface 108 of the vacuum head 106 of the end effector 100 holds the first thermoplastic part in place relative to the vacuum surface 108 and/or relative to the second thermoplastic part. Once the welding operation is complete, the welding tip 308 of the welder 304 of FIGS. 1-8 retracts back through the vacuum surface 108 of the vacuum head 106 and into the first aperture 116 of the vacuum head 106 as the welder 304 returns along the first central axis 310 from the first example extended position of the welder 304 (e.g., as shown in FIG. 8) to the first example retracted position of the welder 304 (e.g., as shown in FIG. 4).

The welding head 302 of the end effector 100 of FIGS. 1-8 further includes an example compaction foot 312. The compaction foot 312 of FIGS. 1-8 is configured and/or structured to compact and/or debulk a stack and/or layup of thermoplastic parts (e.g., a first thermoplastic part stacked and/or laid up onto a second thermoplastic part) prior to, during and/or following the welding of a first thermoplastic part within the stack and/or layup to a second thermoplastic part within the stack and/or layup via the welder 304 of FIGS. 1-8 described above. In some examples, the compaction foot 312 can be coupled to the welding head 302 and/or the frame 104 of the end effector 100 of FIGS. 1-8 in a pressurized and/or spring-loaded manner that causes movement of the compaction foot 312 relative to the welding head 302 and/or the frame 104 of the end effector 100. For example, the compaction foot 312 of FIGS. 1-8 is coupled to a second example air cylinder 314 that causes movement of the compaction foot 312 relative to the welding head 302 and/or the frame 104 of the end effector 100. In some examples, movement of the compaction foot 312 relative to the welding head 302 and/or the frame 104 via the second air cylinder 314 enables the pressure and/or the force at which the compaction foot 312 operates (e.g., the pressure and/or the force at which the compaction foot 312 compacts and/or debulks a stack and/or layup of thermoplastic parts) to be controlled and/or adjusted depending upon material and/or specification requirements associated with the compacting and/or debulking operation to be performed. The period of time (e.g., the duration) for which the compaction foot 312 remains in any particular position (e.g., any retracted position or any extended position) can also be controlled and/or adjusted via the second air cylinder 314. In the illustrated example of FIGS. 1-8 the first air cylinder 306 and the second air cylinder 314 are independently controllable and/or independently adjustable relative to one another.

The compaction foot 312 of FIGS. 1-8 includes an example compaction surface 316, and has a second example central axis 318. In the illustrated example of FIGS. 1-8, the compaction surface 316 has a circular cross-sectional shape. In other examples, the compaction surface 316 can have a different cross-sectional shape and/or area (e.g., a non-circular cross-sectional shape and/or area, a differently sized cross-sectional shape and/or area, etc.). The compaction surface 316 and/or, more generally, the compaction foot 312 of FIGS. 1-8 is/are movable along the second central axis 318 between a second retracted position of the compaction foot and a second extended position of the compaction foot. In some examples, movement of the compaction surface 316 and/or the compaction foot 312 occur(s) relative to the vacuum surface 108 of the vacuum head 106 of the end effector 100 of FIGS. 1-8. For example, the compaction surface 316 and/or, more generally, the compaction foot 312 of FIGS. 1-8 can be moved, along the second central axis 318, from the second example retracted position of the compaction foot 312 associated with the first configuration 102 of the end effector 100 shown in FIGS. 1-4 (e.g., a position in which the compaction surface 316 of the compaction foot 312 is located within the first aperture 116 of the vacuum head 106) to a second example extended position of the compaction foot 312 associated with the second configuration 502 of the end effector 100 shown in FIGS. 5 and 6, and/or associated with the third configuration 702 of the end effector 100 shown in FIGS. 7 and 8 (e.g., a position in which the compaction surface 316 of the compaction foot 312 is located outside of the first aperture 116 of the vacuum head 106).

The compaction surface 316 and/or, more generally, the compaction foot 312 can be moved along the second central axis 318 from and/or into a variety of different retracted positions and extended positions. In other words, the compaction surface 316 and/or the compaction foot 312 can have variable and/or adjustable retracted positions and variable and/or adjustable extended positions. For example, the extended position of the compaction surface 316 and/or the compaction foot 312 may vary based on the extent and/or degree of extension that may be required of the compaction surface 316 and/or the compaction foot 312 to sufficiently debulk a stack of thermoplastic parts.

In some examples, the compaction surface 316 of the compaction foot 312 of FIGS. 1-8 extends from within the first aperture 116 of the vacuum head 106 and past the vacuum surface 108 of the vacuum head 106 when the compaction foot 312 moves along the second central axis 318 from the second example retracted position of the compaction foot 312 (e.g., as shown in FIG. 4) to the second example extended position of the compaction foot 312 (e.g., as shown in FIGS. 5-8). As a result, the compaction surface 316 of the compaction foot 312 can compact and/or debulk a stack and/or layup of thermoplastic parts. In some examples, the compaction surface 316 of the compaction foot 312 can compact and/or debulk a stack and/or layup of thermoplastic parts while the vacuum surface 108 of the vacuum head 106 of the end effector 100 holds the uppermost thermoplastic part of the stack and/or layup in place relative to the vacuum surface 108 and/or relative to the remaining thermoplastic part(s) of the stack and/or layup. Once the compacting and/or debulking operation is complete, the compaction surface 316 of the compaction foot 312 of FIGS. 1-8 retracts back through the vacuum surface 108 of the vacuum head 106 and into the first aperture 116 of the vacuum head 106 as the compaction foot 312 returns along the second central axis 318 from the second example extended position of the compaction foot 312 (e.g., as shown in FIGS. 5-8) to the second example retracted position of the compaction foot 312 (e.g., as shown in FIG. 4).

The compaction foot 312 of the welding head 302 of FIGS. 1-8 also includes a second example aperture 320 extending through the compaction surface 316 of the compaction foot 312. In the illustrated example of FIGS. 1-8, the second aperture 320 has a circular cross-sectional shape and/or area. In other examples, the second aperture 320 can have a different cross-sectional shape and/or area (e.g., a non-circular cross-sectional shape and/or area, a differently sized cross-sectional shape and/or area, etc.). The welder 304 of the welding head 302 of FIGS. 1-8 is positioned and/or located within the second aperture 320 of the compaction foot 312 of the welding head 302 of FIGS. 1-8 such that the compaction foot 312 of the welding head 302 circumscribes the welder 304 of the welding head 302. The second aperture 320 of the compaction foot 312 of FIGS. 1-8 enables the compaction foot 312 of the welding head 302 of FIGS. 1-8 to move relative to the vacuum surface 108 of the vacuum head 106 of FIGS. 1-8 independently of the welder 304 of the welding head 302 of FIGS. 1-8 moving relative to the vacuum surface 108 of the vacuum head 106 of FIGS. 1-8, and vice-versa. The welder 304 of the welding head 302 of FIGS. 1-8 is accordingly movable relative to the compaction foot 312 of the welding head 302 of FIGS. 1-8.

In the illustrated example of FIGS. 1-8, the second central axis 318 of the compaction foot 312 of the welding head 302 is parallel to and coaxially aligned with the first central axis 310 of the welder 304 of the welding head 302. In other examples, the second central axis 318 of the compaction foot 312 of the welding head 302 of FIGS. 1-8 can be parallel to, but offset from, the first central axis 310 of the welder 304 of the welding head 302 of FIGS. 1-8. In still other examples, the second central axis 318 of the compaction foot 312 of the welding head 302 of FIGS. 1-8 can be oriented at an angle (e.g., non-parallel) relative to the first central axis 310 of the welder 304 of the welding head 302 of FIGS. 1-8.

In the illustrated example of FIGS. 1-8, the vacuum surface 108 of the vacuum head 106 is perpendicular and/or normal to the second central axis 318 of the compaction foot 312 of the welding head 302, the compaction surface 316 of the compaction foot 312 of the welding head 302 is perpendicular and/or normal to the second central axis 318 of the compaction foot 312 of the welding head 302, and the vacuum surface 108 of the vacuum head 106 is parallel to the compaction surface 316 of the compaction foot 312 of the welding head 302. In other examples, the vacuum surface 108 of the vacuum head 106 of FIGS. 1-8 can be oriented at a different angle (e.g., non-perpendicular) relative to the second central axis 318 of the compaction foot 312 of the welding head 302 of FIGS. 1-8, the compaction surface 316 of the compaction foot 312 of the welding head 302 of FIGS. 1-8 can be oriented at a different angle (e.g., non-perpendicular) relative to the second central axis 318 of the compaction foot 312 of the welding head 302 of FIGS. 1-8, and/or the vacuum surface 108 of the vacuum head 106 of FIGS. 1-8 can be oriented at a different angle (e.g., non-parallel) relative to the compaction surface 316 of the compaction foot 312 of the welding head 302 of FIGS. 1-8.

In the illustrated example of FIGS. 1-8, the welder 304 of the welding head 302 is concentrically positioned within the second aperture 320 of the compaction foot 312 of the welding head 302, and the compaction foot 312 of the welding head 302 is concentrically positioned within the first aperture 116 of the vacuum head 106. In other examples, the welder 304 of the welding head 302 of FIGS. 1-8 can be non-concentrically positioned within the second aperture 320 of the compaction foot 312 of the welding head 302 of FIGS. 1-8, and/or the compaction foot 312 of the welding head 302 of FIGS. 1-8 can be non-concentrically positioned within the first aperture 116 of the vacuum head 106 of FIGS. 1-8.

When the end effector 100 of FIGS. 1-8 is in the first configuration 102 shown in FIGS. 1-4, the welder 304 of the welding head 302 is in a first retracted position and the compaction foot 312 of the welding head 302 is in a second retracted position. More specifically, when the end effector 100 of FIGS. 1-8 is in the first configuration 102 shown in FIGS. 1-4, the welding tip 308 of the welder 304 is located within the second aperture 320 of the compaction foot 312, and the compaction surface 316 of the compaction foot 312 is located within the first aperture 116 of the vacuum head 106. Thus, both the welding tip 308 of the welder 304 and the compaction surface 316 of the compaction foot 312 are located within the first aperture 116 (e.g., not extending past the vacuum surface 108) of the vacuum head 106 when the end effector 100 is in the first configuration 102 of FIGS. 1-4. For example, when the welder 304 is in the first retracted position and the compaction foot 312 is in the second retracted position illustrated in the first configuration 102 of FIGS. 1-4, the compaction surface 316 of the compaction foot 312 is approximately parallel and/or coplanar relative to the welding tip 308 of the welder 304, and the compaction surface 316 of the compaction foot 312 does not extend past the vacuum surface 108 of the vacuum head 106.

When the end effector 100 of FIGS. 1-8 is in the second configuration 502 shown in FIGS. 5 and 6, the welder 304 of the welding head 302 is in a first retracted position (e.g., the first retracted position associated with the first configuration 102 of FIGS. 1-4) and the compaction foot 312 of the welding head 302 is in a second extended position. More specifically, when the end effector 100 of FIGS. 1-8 is in the second configuration 502 shown in FIGS. 5 and 6, the welding tip 308 of the welder 304 is located within the second aperture 320 of the compaction foot 312, and the compaction surface 316 of the compaction foot 312 is extended and/or located outside of the first aperture 116 of the vacuum head 106. The welding tip 308 of the welder 304 is located within the first aperture 116 (e.g., not extending past the vacuum surface 108) of the vacuum head 106 when the end effector 100 is in the second configuration 502 of FIGS. 5 and 6. For example, when the welder 304 is in the first retracted position and the compaction foot 312 is in the second extended position illustrated in the second configuration 502 of FIGS. 5 and 6, the compaction surface 316 of the compaction foot 312 extends past the welding tip 308 of the welder 304 and past the vacuum surface 108 of the vacuum head 106, and the welding tip 308 of the welder 304 does not extend past the vacuum surface 108 of the vacuum head 106.

When the end effector 100 of FIGS. 1-8 is in the third configuration 702 shown in FIGS. 7 and 8, the welder 304 of the welding head 302 is in a first extended position and the compaction foot 312 of the welding head 302 is in a second extended position (e.g., the second extended position associated with the second configuration 502 of FIGS. 5 and 6). More specifically, when the end effector 100 of FIGS. 1-8 is in the third configuration 702 shown in FIGS. 7 and 8, the welding tip 308 of the welder 304 is extended and/or located outside of the second aperture 320 of the compaction foot 312, and the compaction surface 316 of the compaction foot 312 is extended and/or located outside of the first aperture 116 of the vacuum head 106. Thus, both the welding tip 308 of the welder 304 and the compaction surface 316 of the compaction foot 312 are extended and/or located outside of the first aperture 116 (e.g., extending past the vacuum surface 108) of the vacuum head 106 when the end effector 100 is in the third configuration 702 of FIGS. 7 and 8. For example, when the welder 304 is in the first extended position and the compaction foot 312 is in the second extended position illustrated in the third configuration 702 of FIGS. 7 and 8, the welding tip 308 of the welder 304 extends to and/or past the compaction surface 316 of the compaction foot 312, and both the welding tip 308 of the welder 304 and the compaction surface 316 of the compaction foot 312 extend past the vacuum surface 108 of the vacuum head 106.

Figure 9:
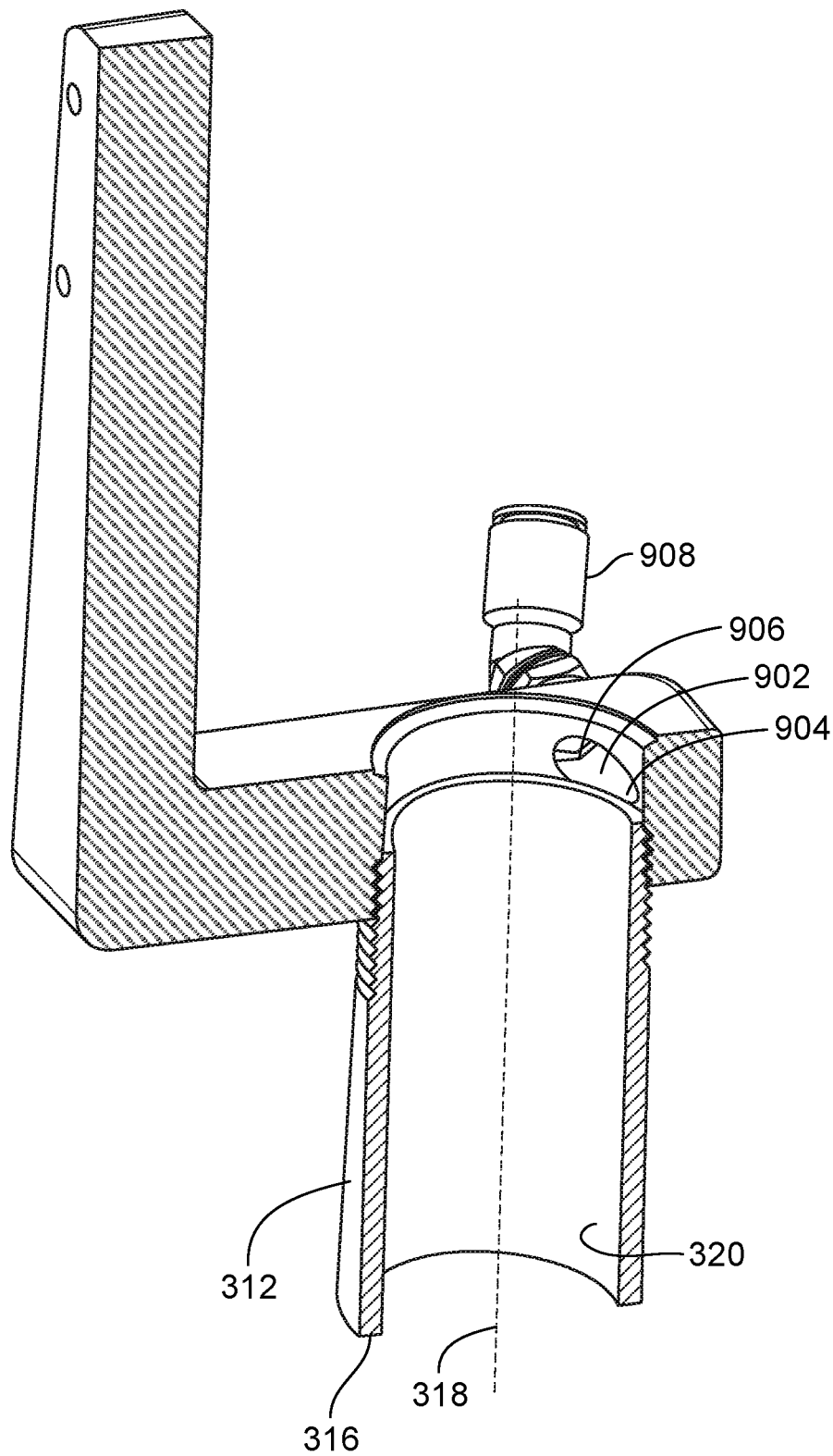
FIG. 9 is a partial cutaway view of the end effector of FIGS. 1-8 illustrating an example cooling nozzle of the end effector.

FIG. 9 is a partial cutaway view of the end effector 100 of FIGS. 1-8 illustrating an example cooling nozzle 902 of the end effector 100. The cooling nozzle 902 of FIG. 9 includes an example discharge end 904 coupled to the compaction foot 312 of the welding head 302 such that the discharge end 904 and/or, more generally, the cooling nozzle 902 is/are in fluid communication with the second aperture 320 of the compaction foot 312. The cooling nozzle 902 of FIG. 9 further includes an example supply end 906 located opposite the discharge end 904. The supply end 906 can be coupled to an example cooling air supply fitting 908, a cooling air supply conduit, and/or a cooling air supply source such that the supply end 906 and/or more generally, the cooling nozzle 902 is/are in fluid communication with a flow of cooling air supplied via the cooling air supply source, the cooling air supply conduit, and/or the cooling air supply fitting 908. The end effector of FIGS. 1-9 further includes a second cooling nozzle (not visible in FIG. 9) located radially opposite (e.g., 180° apart from) the cooling nozzle 902 of FIG. 9 and structured in a manner that is substantially the same as above-described structure of the cooling nozzle 902 of FIG. 9. In other examples, the end effector 100 of FIGS. 1-9 can include a different number of cooling nozzles (e.g., one, three, four, etc.).

The cooling nozzle 902 of FIG. 9 directs a flow of cooling air received from the cooling air supply source, the cooling air supply conduit, and/or the cooling air supply fitting 908 into the second aperture 320 of the compaction foot 312 and toward the welder 304 of the welding head 302. The compaction foot 312 circumscribes the flow of cooling air provided by the cooling nozzle 902 to help retain the flow of cooling air near the welder 304 of the welding head 302, near a weld formed by the welder 304 (e.g., a weld coupling a first thermoplastic part to a second thermoplastic part), and/or near the portion(s) of the first and second thermoplastic parts surrounding the weld. In the illustrated example of FIG. 9, the cooling nozzle 902 is oriented at an angle relative to the compaction foot 312 such that the cooling air directed into the second aperture 320 of the compaction foot 312 is further directed (e.g., in a swirling and/or cyclonic pattern about the welder 304 and within the compaction foot 312) toward the welding tip 308 of the welder 304, toward a weld formed by the welder 304 (e.g., a weld coupling a first thermoplastic part to a second thermoplastic part), and/or the portion(s) of the first and second thermoplastic parts surrounding the weld. Thus, the flow of cooling air provided via the cooling nozzle 902 of FIG. 9 can advantageously cool and/or lower the temperature of a weld formed by the welder 304 during and/or after the welder 304 performs the welding operation (e.g., during or after the welder 304 welds a first thermoplastic part to a second thermoplastic part). The flow of cooling air can also advantageously reduce the likelihood of the welding tip 308 of the welder 304 adhering to the first and/or second thermoplastic parts in connection with the welding operation.

FIGS. 10-14 illustrate example stages (e.g., a first example stage 1002, a second example stage 1102, a third example stage 1202, a fourth example stage 1302, and a fifth example stage 1402) of an example process 1000 to be implemented via the end effector 100 of FIGS. 1-9 to weld a first example thermoplastic part 1004 to a second example thermoplastic part 1006. As further described below, the process 1000 of FIGS. 10-14 includes stacking and/or laying up the first thermoplastic part 1004 onto the second thermoplastic part 1006, compacting and/or debulking the stacked first and second thermoplastic parts 1004, 1006, and welding the compacted first and second thermoplastic parts 1004, 1006 to one another in the course of forming a thermoplastic composite laminated article (e.g., a thermoplastic composite laminated article including at least the first thermoplastic part 1004 and the second thermoplastic part 1006).

In the illustrated example of FIGS. 10-14, the first thermoplastic part 1004 includes a first example end 1008 and a second example end 1010 located opposite the first end 1008 of the first thermoplastic part 1004. The first thermoplastic part 1004 of FIGS. 10-14 is substantially flat and/or planar between the first and second ends 1008, 1010 of the first thermoplastic part 1004. In other examples, the first thermoplastic part 1004 can alternatively include one or more curved and/or sloped portion(s) located between the first and second ends 1008, 1010 of the first thermoplastic part 1004 such that the first thermoplastic part 1004 as a whole is not substantially flat and/or planar.

In the illustrated example of FIGS. 10-14, the second thermoplastic part 1006 includes a first example end 1012 and a second example end 1014 located opposite the first end 1012 of the second thermoplastic part 1006. The second thermoplastic part 1006 further includes a first example portion 1016 extending from the first end 1012 of the second thermoplastic part 1006 toward the second end 1014 of the second thermoplastic part 1006, and a second example portion 1018 oriented at an angle relative to the first portion 1016 and extending from the second end 1014 of the second thermoplastic part 1006 toward the first end 1012 of the second thermoplastic part 1006. Thus, the second thermoplastic part 1006 of FIGS. 10-14 is not substantially flat and/or planar between the first and second ends 1012, 1014 of the second thermoplastic part 1006. In other examples, the second thermoplastic part 1006 can alternatively be substantially flat and/or planar between the first and second ends 1012, 1014 of the second thermoplastic part 1006.

In the illustrated example of FIGS. 10-14, the first thermoplastic part 1004 is a single-ply thermoplastic part. In other examples, the first thermoplastic part 1004 of FIGS. 10-14 can alternatively be a multi-ply thermoplastic part in which the multiple plies of the multi-ply thermoplastic part are not yet welded together. In still other examples, the first thermoplastic part 1004 of FIGS. 10-14 can alternatively be a multi-ply thermoplastic part in which the multiple plies of the multi-ply thermoplastic part are already welded together. In the illustrated example of FIGS. 10-14, the second thermoplastic part 1006 is a multi-ply thermoplastic part in which the multiple plies of the multi-ply thermoplastic part are already welded together. In other examples, the second thermoplastic part 1006 of FIGS. 10-14 can alternatively be a multi-ply thermoplastic part in which the multiple plies of the multi-ply thermoplastic part are not already welded together. In still other examples, the second thermoplastic part 1006 of FIGS. 10-14 can alternatively be a single-ply thermoplastic part.

Figure 10:
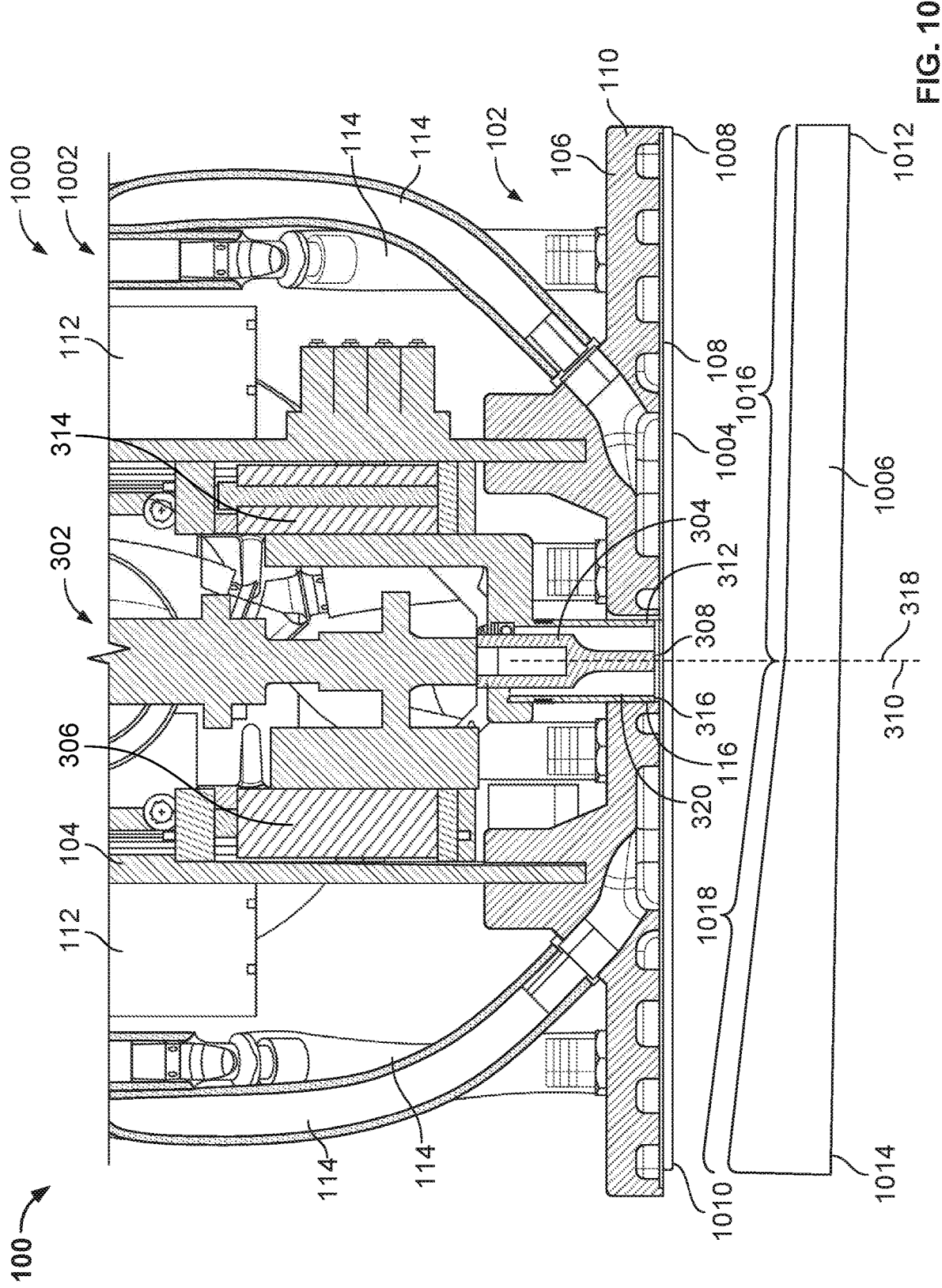
FIG. 10 illustrates a first example stage of an example process to be implemented via the end effector of FIGS. 1-9 to weld a first example thermoplastic part to a second example thermoplastic part.

FIG. 10 illustrates the first stage 1002 of the process 1000 of FIGS. 10-14. During the first stage 1002 of the process 1000 of FIGS. 10-14, the vacuum surface 108 and/or, more generally, the vacuum head 106 of the end effector 100 of FIGS. 1-9 picks up the first thermoplastic part 1004 (e.g., from a first location) and positions and/or stacks the first thermoplastic part 1004 (e.g., at a second location) onto and/or against the second thermoplastic part 1006. The first thermoplastic part 1004 is released from the vacuum surface 108 of the vacuum head 106 in connection with the first thermoplastic part 1004 being positioned and/or stacked onto and/or against the second thermoplastic part 1006. The end effector 100 of FIGS. 1-9 is positioned and/or remains positioned in the first configuration 102 of FIGS. 1-4 described above while the first stage 1002 of the process 1000 of FIGS. 10-14 is being performed.

As shown in FIG. 10, the relative size and the planar shape of the vacuum surface 108 and/or, more generally, of the vacuum head 106, prevents the vacuum surface 108 and/or the vacuum head 106 from being conformable to and/or being conformable with the upper surface of the second thermoplastic part 1006. Thus, while the vacuum surface 108 and/or, more generally, the vacuum head 106 of the end effector 100 of FIGS. 1-9 is fully capable of picking up the first thermoplastic part 1004 (e.g., from a first location) and positioning and/or stacking the first thermoplastic part 1004 (e.g., at a second location) onto and/or against the second thermoplastic part 1006, the vacuum surface 108 and/or, more generally, the vacuum head 106 of the end effector 100 of FIGS. 1-9 cannot effectively compact and/or debulk the stacked first and second thermoplastic parts 1004, 1006.

Figure 11:
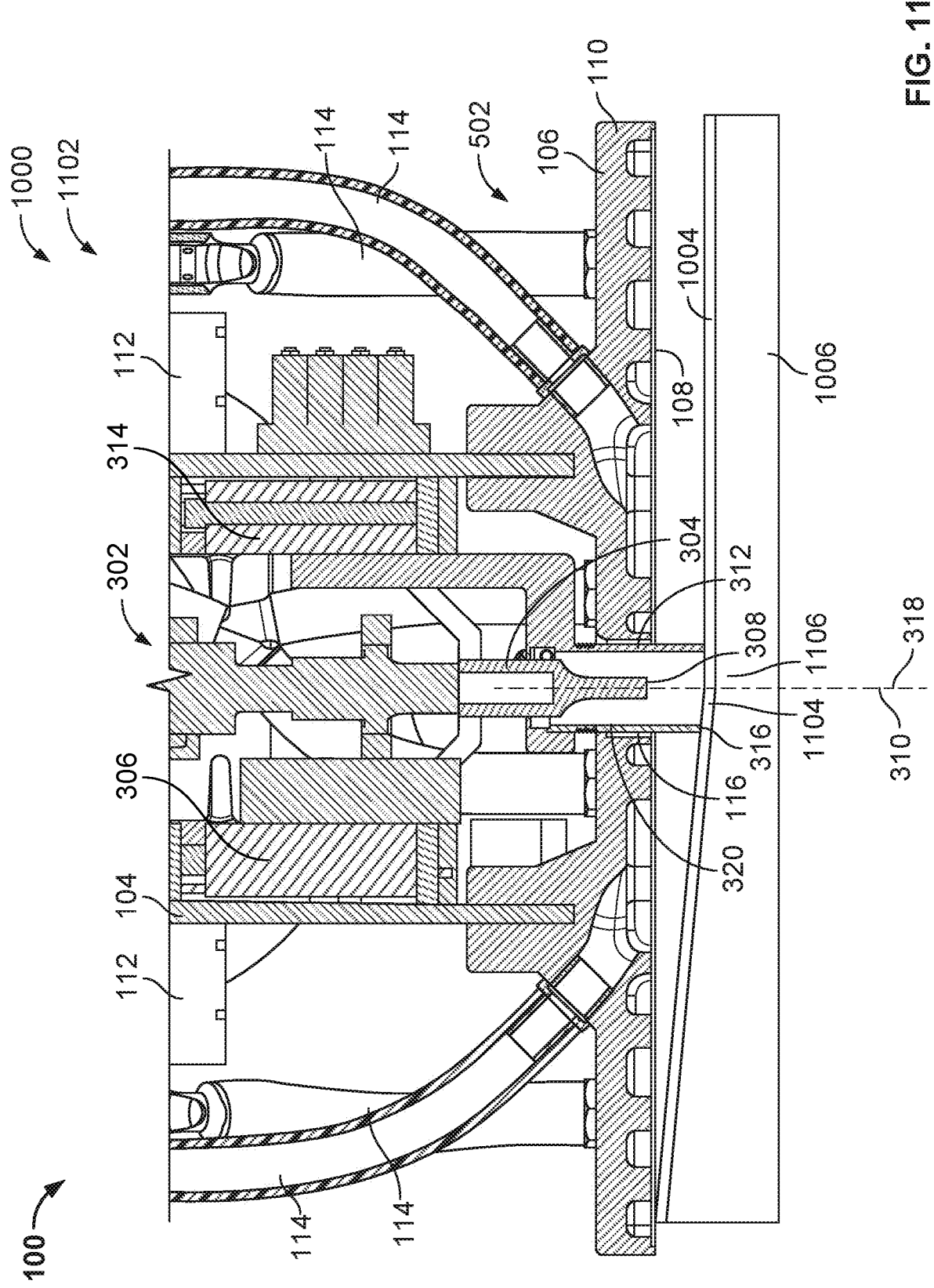
FIG. 11 illustrates a second example stage of the process of FIG. 10.

FIG. 11 illustrates the second stage 1102 of the process 1000 of FIGS. 10-14. During the second stage 1102 of the process 1000 of FIGS. 10-14, the compaction surface 316 and/or, more generally, the compaction foot 312 of the welding head 302 of the end effector 100 of FIGS. 1-9 compacts the first thermoplastic part 1004 and the second thermoplastic part 1006 based on the compaction foot 312 being moved from the second retracted position described above to the second extended position described above. More specifically, the compaction surface 316 and/or the compaction foot 312 of the welding head 302 of FIGS. 1-9 compacts a first example area 1104 of the first thermoplastic part 1004 and a second example area 1106 of the second thermoplastic part 1006. The end effector 100 of FIGS. 1-9 transitions from being positioned in the first configuration 102 of FIGS. 1-4 described above to being positioned in the second configuration 502 of FIGS. 5 and 6 described above while the second stage 1102 of the process 1000 of FIGS. 10-14 is being performed. The location and/or position of the end effector 100 relative to the first and second thermoplastic parts 1004, 1006 may differ between the first stage 1002 and the second stage 1102 of the process 1000, as the above-described compaction operation associated with the second stage 1102 of the process 1000 can be performed independently of the above-described positioning and stacking operations associated with the first stage 1002 of the process 1000. The compaction operation can only be performed, however, when the end effector 100 is within a predetermined range of the first thermoplastic part 1004.

Figure 12:
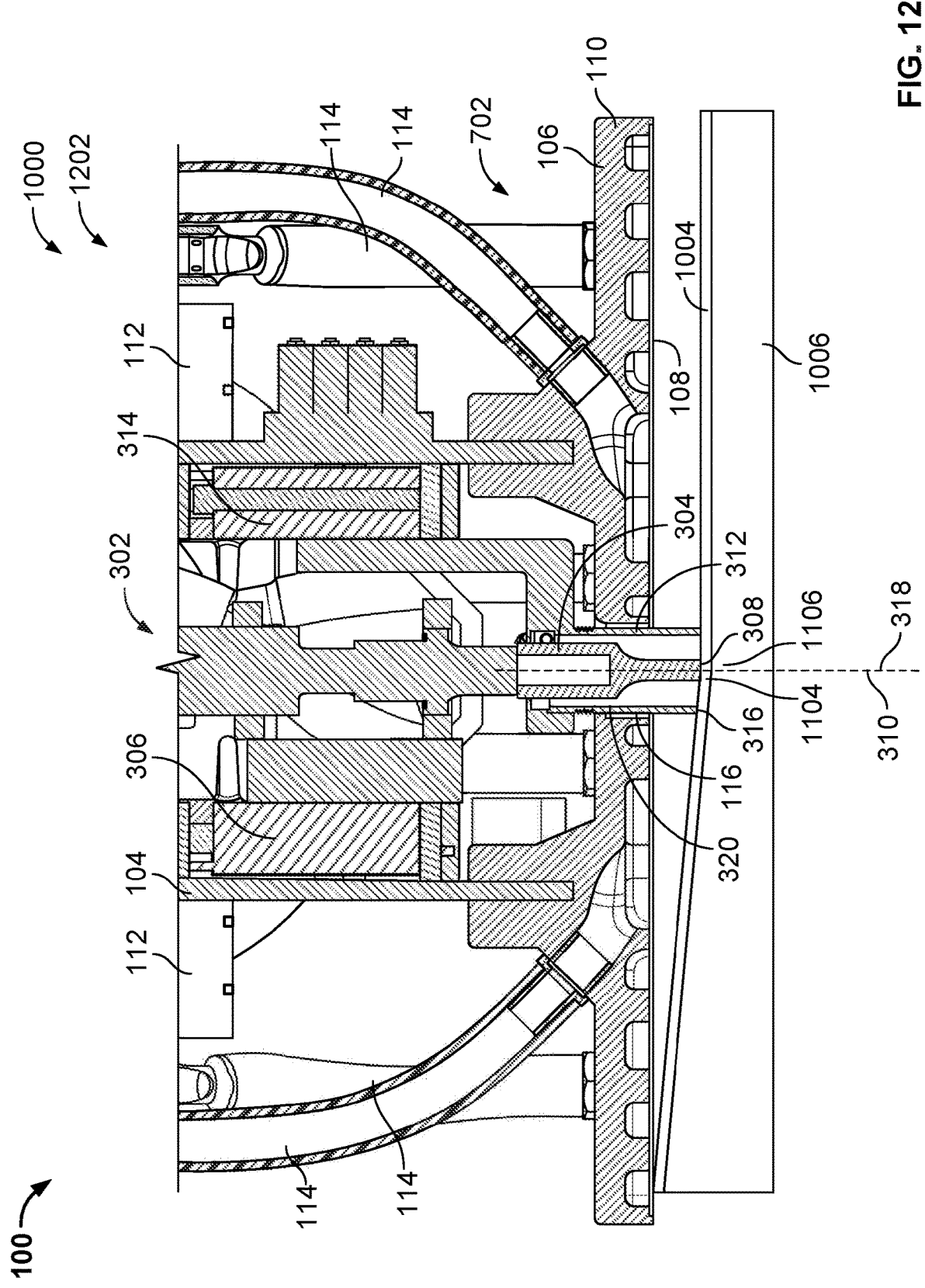
FIG. 12 illustrates a third example stage of the process of FIGS. 10 and 11.

FIG. 12 illustrates the third stage 1202 of the process 1000 of FIGS. 10-14. During the third stage 1202 of the process 1000 of FIGS. 10-14, the welding tip 308 and/or, more generally, the welder 304 of the welding head 302 of the end effector 100 of FIGS. 1-9 welds the first thermoplastic part 1004 to the second thermoplastic part 1006 as a result of the welder 304 being moved from the first retracted position described above to the first extended position described above. More specifically, the welding tip 308 and/or the welder 304 of the welding head 302 of FIGS. 1-9 welds a first portion of the first thermoplastic part 1004 located within the first area 1104 of the first thermoplastic part 1004 to a second portion of the second thermoplastic part 1006 located within the second area 1106 of the second thermoplastic part 1006. The end effector 100 of FIGS. 1-9 transitions from being positioned in the second configuration 502 of FIGS. 5 and 6 described above to being positioned in the third configuration 702 of FIGS. 7 and 8 described above while the third stage 1202 of the process 1000 of FIGS.

10-14 is being performed. The location and/or position of the end effector 100 relative to the first and second thermoplastic parts 1004, 1006 may differ between the first stage 1002 and the third stage 1202 of the process 1000, as the above-described welding operation associated with the third stage 1202 of the process 1000 can be performed independently of the above-described positioning and stacking operations associated with the first stage 1002 of the process 1000. The welding operation can only be performed, however, when the end effector 100 is within a predetermined range of the first thermoplastic part 1004.

Figure 13:
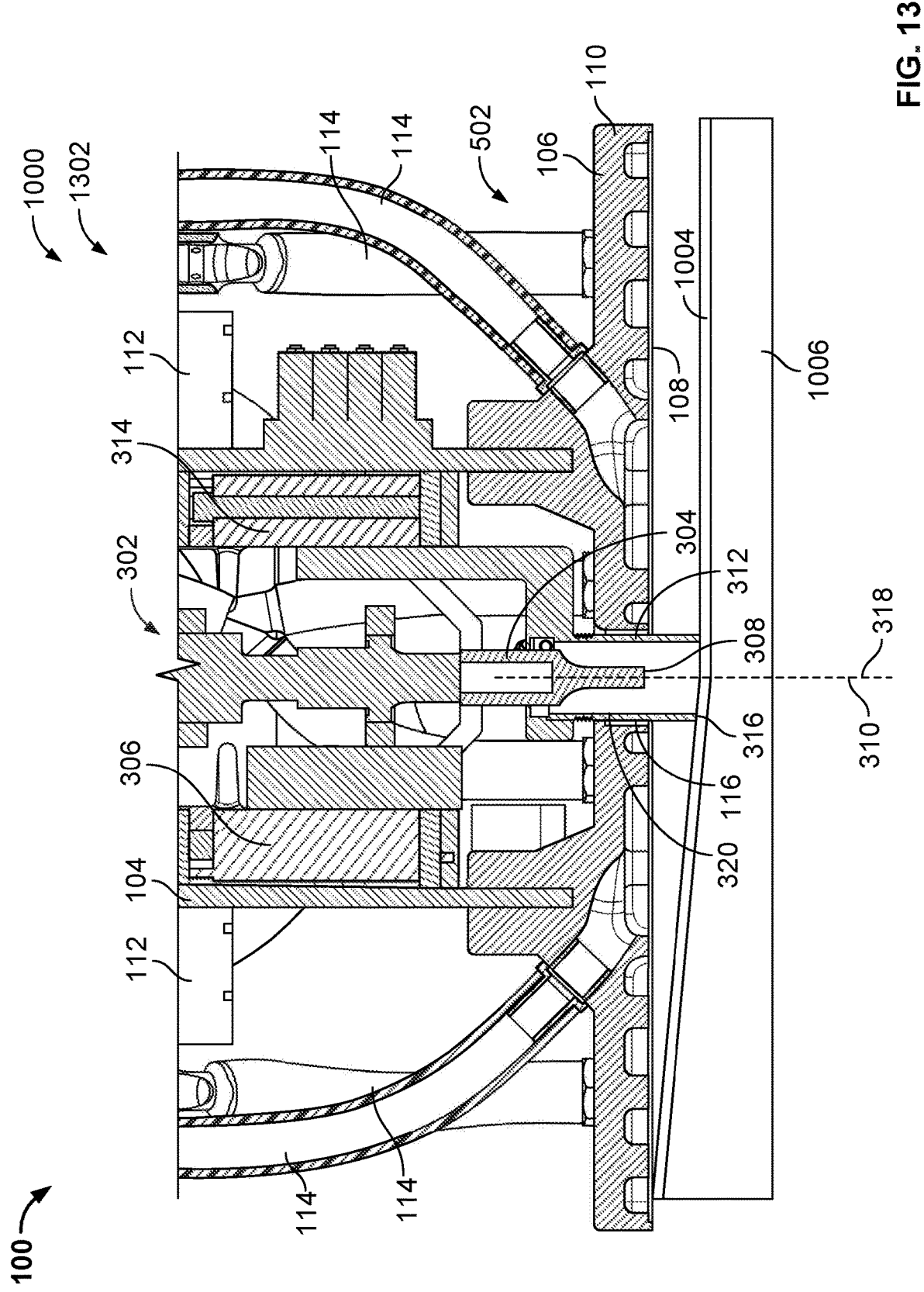
FIG. 13 illustrates a fourth example stage of the process of FIGS. 10-12.

FIG. 13 illustrates the fourth stage 1302 of the process 1000 of FIGS. 10-14. During the fourth stage 1302 of the process 1000 of FIGS. 10-14, the welder 304 of the welding head 302 of the end effector 100 of FIGS. 1-9 returns from the first extended position described above to the first retracted position described above following the completion of the weld by the welder 304. The compaction foot 312 of the welding head 302 of the end effector 100 of FIGS. 1-9 is maintained in the second extended position described above for a predetermined period of time following completion of the weld by the welder 304. The end effector 100 of FIGS. 1-9 transitions from being positioned in the third configuration 702 of FIGS. 7 and 8 described above to being positioned in the second configuration 502 of FIGS. 5 and 6 described above while the fourth stage 1302 of the process 1000 of FIGS. 10-14 is being performed.

Figure 14:
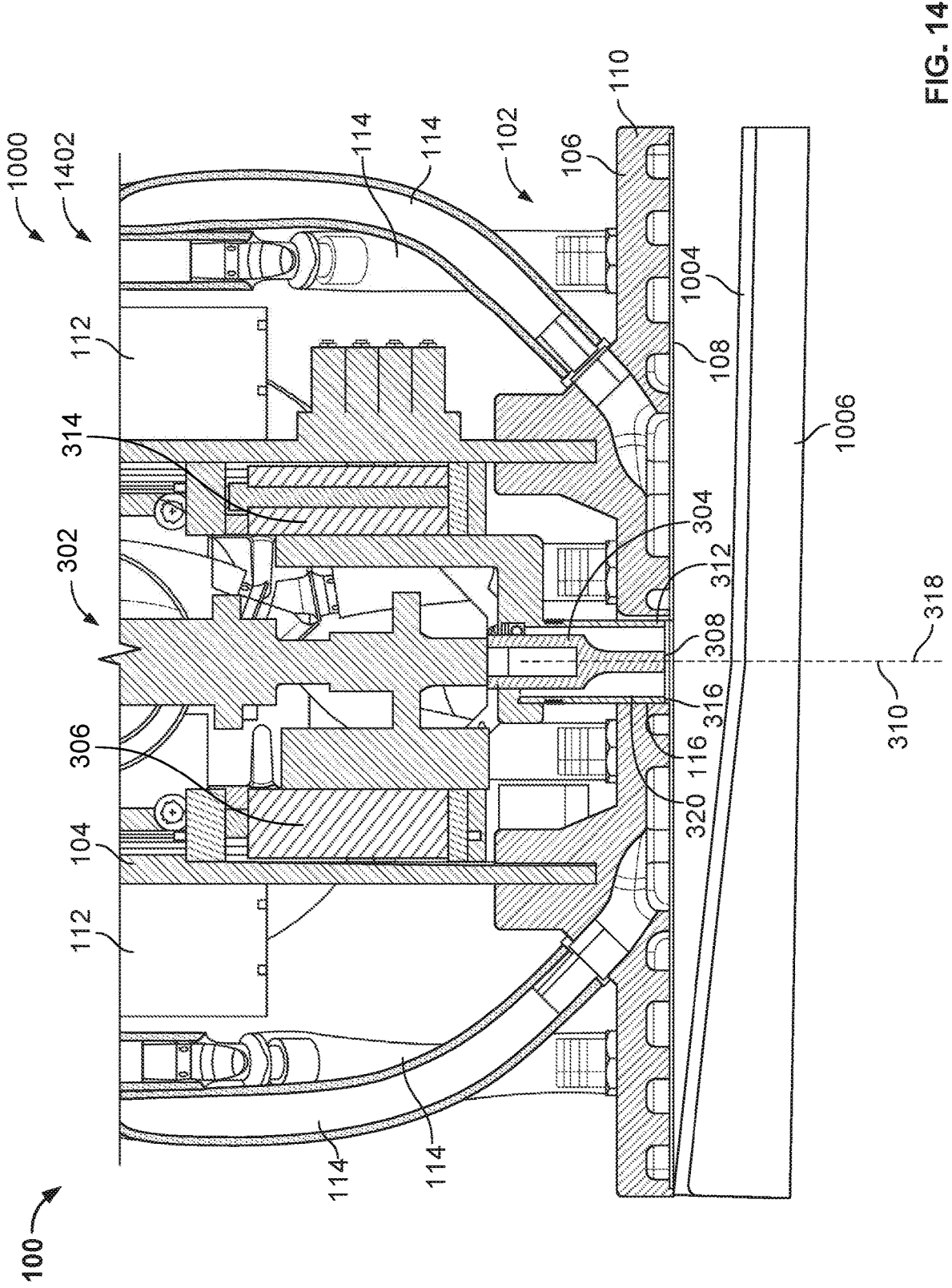
FIG. 14 illustrates a fifth example stage of the process of FIGS. 10-13.

FIG. 14 illustrates the fifth stage 1402 of the process 1000 of FIGS. 10-14. During the fifth stage 1402 of the process 1000 of FIGS. 10-14, the compaction foot 312 of the welding head 302 of the end effector 100 of FIGS. 1-9 returns from the second extended position described above to the second retracted position described above following expiration of the predetermined time period. The end effector 100 of FIGS. 1-9 transitions from being positioned in the second configuration 502 of FIGS. 5 and 6 described above to being positioned in the first configuration 102 of FIGS. 1-4 described above while the fifth stage 1402 of the process 1000 of FIGS. 10-14 is being performed.

In connection with the process 1000 of FIGS. 10-14 described above, the cooling nozzle 902 of the end effector 100 of FIGS. 1-9 can direct a flow of cooling air into the second aperture 320 of the compaction foot 312 of the end effector 100 of FIGS. 1-9, toward the welding tip 308 of the welder 304 of the end effector 100 of FIGS. 1-9, toward a weld formed by the welder 304 of the end effector 100 of FIGS. 1-9 (e.g., a weld coupling a first thermoplastic part to a second thermoplastic part), and/or toward the portion(s) of the first and second thermoplastic parts surrounding the weld. For example, the cooling nozzle 902 can direct a flow of cooling air into the second aperture 320 of the compaction foot 312 of FIGS. 1-9, toward the welding tip 308 of the welder 304 of FIGS. 1-9, toward a weld formed by the welder 304 of FIGS. 1-9, and/or toward the portion(s) of the first and second thermoplastic parts surrounding the weld during one or more of the first stage 1002, the second stage 1102, the third stage 1202, the fourth stage 1302 and/or the fifth stage 1402 of the process 1000 of FIGS. 10-14 described above. In some examples, the cooling nozzle 902 preferably directs a flow of cooling air into the second aperture 320 of the compaction foot 312 of FIGS. 1-9, toward the welding tip 308 of the welder 304 of FIGS. 1-9, toward a weld formed by the welder 304 of FIGS. 1-9, and/or toward the portion(s) of the first and second thermoplastic parts surrounding the weld during the third stage 1202 and/or the fourth stage 1302 of the process 1000 of FIGS. 10-14 described above FIG. 15 is a flowchart representative of an example method 1500 for implementing the example end effector 100 of FIGS. 1-9 to weld a first thermoplastic part to a second thermoplastic part. In some examples, the method 1500 of FIG. 15 can be implemented in connection with the end effector 100 performing the example process 1000 of FIGS. 10-14 described above. In some examples, the method 1500 of FIG. 15 can be implemented via the example end effector 100 of FIGS. 1-9 as programmed and/or controlled via a robot to which the end effector 100 is coupled.

Figure 15:
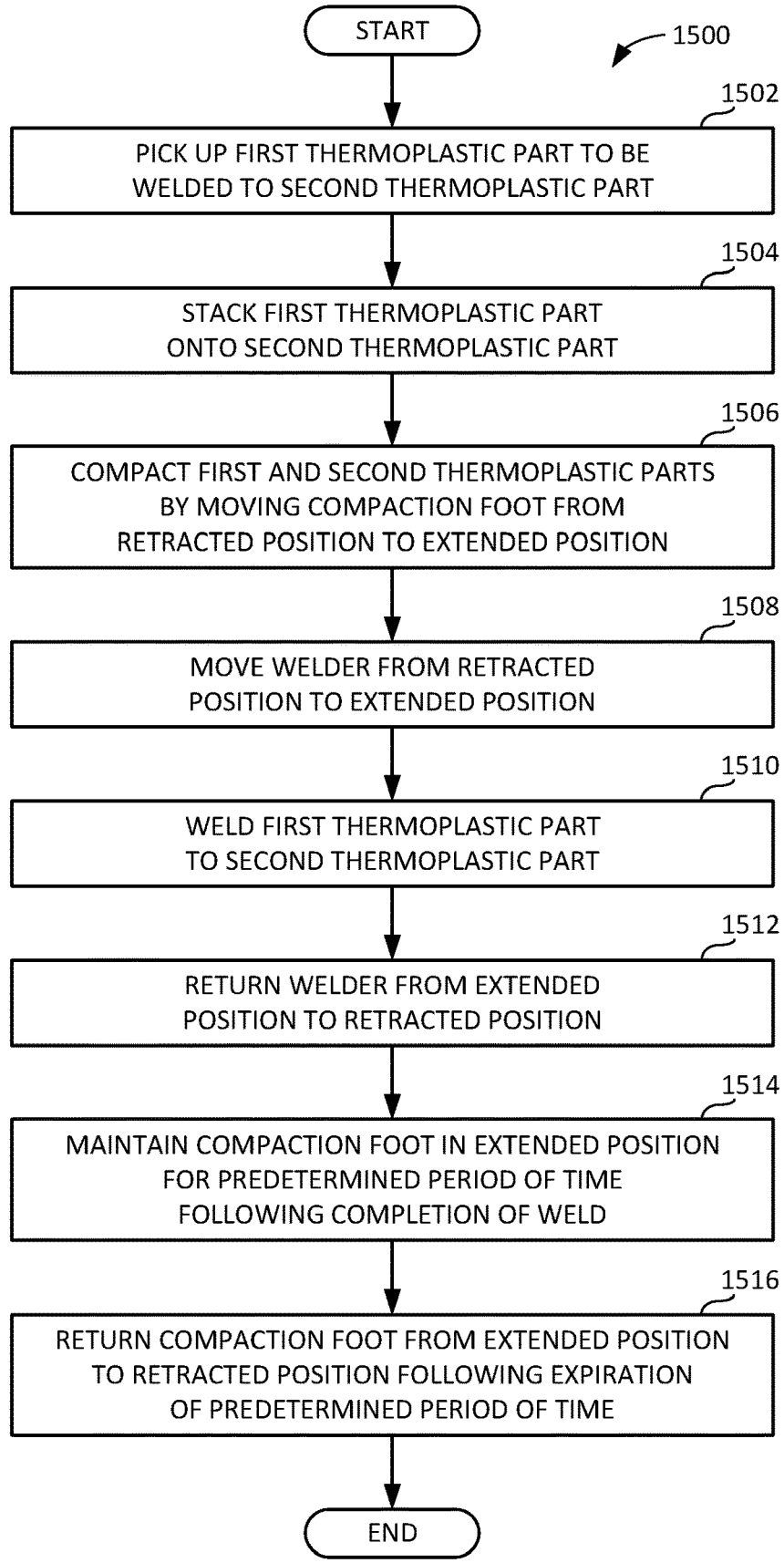
FIG. 15 is a flowchart representative of an example method for implementing the example end effector of FIGS. 1-9 to weld a first thermoplastic part to a second thermoplastic part.

The method 1500 of FIG. 15 begins with picking up a first thermoplastic part to be welded to a second thermoplastic part (block 1502). For example, the vacuum surface 108 and/or, more generally, the vacuum head 106 of the end effector 100 of FIGS. 1-9 can pick up the first thermoplastic part 1004 of FIGS. 10-14 from a first location. The end effector 100 of FIGS. 1-9 can be positioned and/or remain positioned in the first configuration 102 of FIGS. 1-4 described above while block 1502 of the method 1500 of FIG. 15 is being performed. Following block 1502, the method 1500 of FIG. 15 proceeds to block 1504.

The method 1500 of FIG. 15 includes stacking the first thermoplastic part onto the second thermoplastic part (block 1504). For example, the vacuum surface 108 and/or, more generally, the vacuum head 106 of the end effector 100 of FIGS. 1-9 can position and/or stack the first thermoplastic part 1004 of FIGS. 10-14 at a second location onto and/or against the second thermoplastic part 1006 of FIGS. 10-14. The end effector 100 of FIGS. 1-9 can be positioned and/or remain positioned in the first configuration 102 of FIGS. 1-4 described above while block 1502 of the method 1500 of FIG. 15 is being performed. Following block 1504, the method 1500 of FIG. 15 proceeds to block 1506.

The method 1500 of FIG. 15 includes compacting the first thermoplastic part and the second thermoplastic part by moving a compaction foot from a retracted position to an extended position (block 1506). For example, the compaction surface 316 and/or, more generally, the compaction foot 312 of the welding head 302 of the end effector 100 of FIGS. 1-9 can compact the first thermoplastic part 1004 of FIGS. 10-14 and the second thermoplastic part 1006 of FIGS. 10-14 based on the compaction foot 312 being moved from the second retracted position described above to the second extended position described above. More specifically, the compaction surface 316 and/or the compaction foot 312 of the welding head 302 of FIGS. 1-9 can compact the first area 1104 of the first thermoplastic part 1004 of FIGS. 10-14 and the second area 1106 of the second thermoplastic part 1006 of FIGS. 10-14. The end effector 100 of FIGS. 1-9 can transition from being positioned in the first configuration 102 of FIGS. 1-4 described above to being positioned in the second configuration 502 of FIGS. 5 and 6 described above while block 1506 of the method 1500 of FIG. 15 is being performed. Following block 1506, the method 1500 of FIG. 15 proceeds to block 1508.

The method 1500 of FIG. 15 includes moving a welder from a retracted position to an extended position (block 1508). For example, the welder 304 of the welding head 302 of the end effector 100 of FIGS. 1-9 can be moved from the first retracted position described above to the first extended position described above. The end effector 100 of FIGS. 1-9 can transition from being positioned in the second configuration 502 of FIGS. 5 and 6 described above to being positioned in the third configuration 702 of FIGS. 7 and 8 described above while block 1508 of the method 1500 of FIG. 15 is being performed. Following block 1508, the method 1500 of FIG. 15 proceeds to block 1510.

The method 1500 of FIG. 15 includes welding the first thermoplastic part to the second thermoplastic part (block 1510). For example, the welding tip 308 and/or, more generally, the welder 304 of the welding head 302 of the end effector 100 of FIGS. 1-9 can weld the first thermoplastic part 1004 of FIGS. 10-14 to the second thermoplastic part 1006 of FIGS. 10-14. More specifically, the welding tip 308 and/or the welder 304 of the welding head 302 of FIGS. 1-9 can weld the first portion of the first thermoplastic part 1004 located within the first area 1104 of the first thermoplastic part 1004 of FIGS. 10-14 to a second portion of the second thermoplastic part 1006 located within the second area 1106 of the second thermoplastic part 1006 of FIGS. 10-14. The end effector 100 of FIGS. 1-9 can remain positioned in the third configuration 702 of FIGS. 7 and 8 described above while block 1510 of the method 1500 of FIG. 15 is being performed. Following block 1510, the method 1500 of FIG. 15 proceeds to block 1512.

The method 1500 of FIG. 15 includes returning the welder from the extended position to the retracted position following completion of the weld (block 1512). For example, the welder 304 of the welding head 302 of the end effector 100 of FIGS. 1-9 can return from the first extended position described above to the first retracted position described above following the completion of the weld by the welder 304 at block 1510. The end effector 100 of FIGS. 1-9 can transition from being positioned in the third configuration 702 of FIGS. 7 and 8 described above to being positioned in the second configuration 502 of FIGS. 5 and 6 described above while block 1512 of the method 1500 of FIG. 15 is being performed. Following block 1512, the method 1500 of FIG. 15 proceeds to block 1514.

The method 1500 of FIG. 15 includes maintaining the compaction foot in the extended position for a predetermined period of time following completion of the weld (block 1514). For example, the compaction foot 312 of the welding head 302 of the end effector 100 of FIGS. 1-9 can be maintained in the second extended position described above for a predetermined period of time following completion of the weld by the welder 304 at block 1510 and/or following the return of the welder 304 from the first extended position to the first retracted position at block 1512. The end effector 100 of FIGS. 1-9 can remain positioned in the second configuration 502 of FIGS. 5 and 6 described above while block 1514 of the method 1500 of FIG. 15 is being performed. Following block 1514, the method 1500 of FIG. 15 proceeds to block 1516.

The method 1500 of FIG. 15 includes returning the compaction foot from the extended position to the retracted position following expiration of the predetermined period of time (block 1516). For example, the compaction foot 312 of the welding head 302 of the end effector 100 of FIGS. 1-9 can return from the second extended position described above to the second retracted position described above following expiration of the predetermined time period at block 1514. The end effector 100 of FIGS. 1-9 can transition from being positioned in the second configuration 502 of FIGS. 5 and 6 described above to being positioned in the first configuration 102 of FIGS. 1-4 described above while block 1516 of the method 1500 of FIG. 15 is being performed. Following block 1516, the method 1500 of FIG. 15 ends.

In connection with the method 1500 of FIG. 15 described above, the cooling nozzle 902 of the end effector 100 of FIGS. 1-9 can direct a flow of cooling air into the second aperture 320 of the compaction foot 312 of the end effector 100 of FIGS. 1-9, toward the welding tip 308 of the welder 304 of the end effector 100 of FIGS. 1-9, toward a weld formed by the welder 304 of the end effector 100 of FIGS. 1-9 (e.g., a weld coupling a first thermoplastic part to a second thermoplastic part), and/or toward the portion(s) of the first and second thermoplastic parts surrounding the weld. For example, the cooling nozzle 902 can direct a flow of cooling air into the second aperture 320 of the compaction foot 312, toward the welding tip 308 of the welder 304 of FIGS. 1-9, toward a weld formed by the welder 304 of FIGS. 1-9, and/or toward the portion(s) of the first and second thermoplastic parts surrounding the weld during one or more of blocks 1502, 1504, 1506, 1508, 1510, 1512, 1514 and/or 1516 of the method 1500 of FIG. 15 described above.

From the foregoing, it will be appreciated that the disclosed end effectors include a welder that is movable between a first retracted position and a first extended position relative to a surface (e.g., a vacuum surface) of the end effector, and a compaction foot that circumscribes the welder and is movable between a second retracted position and a second extended position relative to the surface of the end effector. The welder and the compaction foot of the disclosed end effectors are movable independently of and/or relative to one another. The compaction foot of the disclosed end effectors can advantageously be moved from the second retracted position to the second extended position to compact and/or debulk an area of a layup prior to a first thermoplastic part of the layup being welded to a second thermoplastic part of the layup. While the compaction foot is compacting and/or debulking the area of the layup, the welder can be moved from the first retracted position to the first extended position to weld a portion of the first thermoplastic part located within the compacted and/or debulked area to a portion of the second thermoplastic part located within the compacted and/or debulked area. Following completion of the weld, the welder can advantageously return from the first extended position to the first retracted position while the compaction foot remains in the second extended position to continue compacting and/or debulking the welded thermoplastic parts. The weld applied to the first and second thermoplastic parts accordingly has an opportunity to cool without the first and second thermoplastic parts being held together by the force of the welding tip of the welder. Cooling of the weld via the disclosed end effectors accordingly improves the likelihood of the weld being successful, and/or reduces the likelihood of the weld failing or breaking. In some disclosed examples, the cooling of the weld is enhanced and/or alternatively implemented by directing a flow of cooling air toward the welding tip of the welder via the end effector in connection with the welding process. In some disclosed examples, the flow of cooling air is directed toward a weld that has been applied to the first and second thermoplastic parts, and/or is directed toward the portion(s) of the first and second thermoplastic parts surrounding the weld.

In some examples, an end effector to be coupled to a robot is disclosed. In some disclosed examples, the end effector comprises a welding head. In some disclosed examples, the welding head includes a welder having a first central axis and a compaction foot having a second central axis. In some disclosed examples, the welder is movable along the first central axis between a first retracted position and a first extended position relative to a surface of the end effector. In some disclosed examples, the compaction foot circumscribes the welder and is movable along the second central axis between a second retracted position and a second extended position relative to the surface.

In some disclosed examples, the compaction foot is movable relative to the surface independently of the welder being movable relative to the surface. In some disclosed examples, the compaction foot is movable relative to the welder.

In some disclosed examples, the second central axis is coaxially aligned with the first central axis. In some disclosed examples, the second central axis is parallel to the first central axis, and the surface is oriented perpendicularly to the second central axis.

In some disclosed examples, the compaction foot includes a compaction surface. In some disclosed examples, the compaction surface is to compact an area of a thermoplastic part when the compaction foot is in the second extended position. In some disclosed examples, the compaction surface has a circular cross-sectional shape.

In some disclosed examples, the area is a first area and the thermoplastic part is a first thermoplastic part positioned against a second thermoplastic part. In some disclosed examples, the compaction surface is to compact the first area of the first thermoplastic part and a second area of the second thermoplastic part when the compaction foot is in the second extended position.

In some disclosed examples, a welding tip of the welder is to weld a first portion of the first thermoplastic part located within the first area to a second portion of the second thermoplastic part located within the second area when the welder is in the first extended position. In some disclosed examples, the welding tip extends past the compaction surface when the welder is in the first extended position and the compaction foot is in the second extended position.

In some disclosed examples, the surface is a vacuum surface of a vacuum head. In some disclosed examples, the vacuum head has an aperture circumscribing the compaction foot. In some disclosed examples, the compaction surface is parallel to the vacuum surface.

In some disclosed examples, the welding head further includes a nozzle to direct a flow of cooling air toward the welding tip. In some disclosed examples, the compaction foot circumscribes the flow of cooling air provided by the nozzle.

In some examples, an end effector to be coupled to a robot is disclosed. In some disclosed examples, the end effector comprises a welding head. In some disclosed examples, the welding head includes a welder and a nozzle. In some disclosed examples, the welder has a central axis and is movable along the central axis between a retracted position and an extended position relative to a vacuum surface of a vacuum head of the end effector. In some disclosed examples, the nozzle is to direct a flow of cooling air toward a welding tip of the welder.

In some disclosed examples, the central axis is a first central axis, the retracted position is a first retracted position, and the extended position is a first extended position. In some disclosed examples, the welding head further includes a compaction foot having a second central axis. In some disclosed examples, the compaction foot circumscribes the welder and is movable along the second central axis between a second retracted position and a second extended position relative to the vacuum surface.

In some disclosed examples, the compaction foot circumscribes the flow of cooling air provided by the nozzle. In some disclosed examples, the compaction foot is movable relative to the vacuum surface independently of the welder being movable relative to the vacuum surface. In some disclosed examples, the compaction foot is movable relative to the welder.

In some disclosed examples, the second central axis is coaxially aligned with the first central axis. In some disclosed examples, the second central axis is parallel to the first central axis, and the vacuum surface is oriented perpendicularly to the second central axis.

In some disclosed examples, the compaction foot includes a compaction surface. In some disclosed examples, the compaction surface is to compact an area of a thermoplastic part when the compaction foot is in the second extended position. In some disclosed examples, the compaction surface has a circular cross-sectional shape.

In some disclosed examples, the area is a first area and the thermoplastic part is a first thermoplastic part positioned against a second thermoplastic part. In some disclosed examples, the compaction surface is to compact the first area of the first thermoplastic part and a second area of the second thermoplastic part when the compaction foot is in the second extended position.

In some disclosed examples, the welding tip is to weld a first portion of the first thermoplastic part located within the first area to a second portion of the second thermoplastic part located within the second area when the welder is in the first extended position. In some disclosed examples, the welding tip extends past the compaction surface when the welder is in the first extended position and the compaction foot is in the second extended position.

In some disclosed examples, the vacuum head has an aperture circumscribing the compaction foot. In some disclosed examples, the compaction surface is parallel to the vacuum surface.

In some examples, a method for welding a first thermoplastic part to a second thermoplastic part via a welding head of an end effector coupled to a robot is disclosed. In some disclosed examples, the method comprises positioning the first thermoplastic part against the second thermoplastic part. In some disclosed examples, the method comprises positioning a surface of the end effector toward the first thermoplastic part. In some disclosed examples, the welding head includes a welder having a first central axis and a compaction foot having a second central axis. In some disclosed examples, the welder is movable along the first central axis between a first retracted position and a first extended position relative to the surface. In some disclosed examples, the compaction foot circumscribes the welder and is movable along the second central axis between a second retracted position and a second extended position relative to the surface. In some disclosed examples, the method comprises compacting a first area of the first thermoplastic part and a second area of the second thermoplastic part by moving the compaction foot from the second retracted position to the second extended position. In some disclosed examples, the method comprises moving the welder from the first retracted position to the first extend position. In some disclosed examples, the method comprises welding, via a welding tip of the welder, a first portion of the first thermoplastic part located within the first area to a second portion of the second thermoplastic part located within the second area. In some disclosed examples of the method, the welding is to occur while the welder is in the first extended position and the compaction foot is in the second extended position.

In some disclosed examples of the method, the moving of the welder from the first retracted position to the first extend position occurs while the compaction foot is in the second extended position. In some disclosed examples, the method further comprises directing a flow of cooling air toward the welding tip via a nozzle of the welding head while the welder is in the first extended position. In some disclosed examples, the compaction foot circumscribes the flow of cooling air provided via the nozzle.

In some disclosed examples, the method further comprises returning the welder from the first extended position to the first retracted position subsequent to the welding of the first portion of the first thermoplastic part to the second portion of the second thermoplastic part. In some disclosed examples, the method further comprises directing a flow of cooling air toward the welding tip via a nozzle of the welding head subsequent to the welder being returned from the first extended position to the first retracted position. In some disclosed examples, the compaction foot circumscribes the flow of cooling air provided via the nozzle.

In some disclosed examples, the method further comprises maintaining the compaction foot in the second extended position subsequent to the welder being returned to the first retracted position. In some disclosed examples, the maintaining of the compaction foot in the second extended position occurs for a predetermined period of time subsequent to the welding of the first portion of the first thermoplastic part to the second portion of the second thermoplastic part.

In some disclosed examples of the method, the compaction foot is movable relative to the surface independently of the welder being movable relative to the surface. In some disclosed examples of the method, the compaction foot is movable relative to the welder.

In some disclosed examples of the method, the second central axis is coaxially aligned with the first central axis. In some disclosed examples of the method, the second central axis is parallel to the first central axis, and the surface is oriented perpendicularly to the second central axis.

In some disclosed examples of the method, the compaction foot includes a compaction surface. In some disclosed examples of the method, the compaction surface is to compact the first area of the first thermoplastic part and the second area of the second thermoplastic part when the compaction foot is in the second extended position. In some disclosed examples of the method, the compaction surface has a circular cross-sectional shape. In some disclosed examples of the method, the welding tip extends past the compaction surface when the welder is in the first extended position and the compaction foot is in the second extended position.

In some disclosed examples of the method, the surface is a vacuum surface of a vacuum head. In some disclosed examples of the method, the vacuum head has an aperture circumscribing the compaction foot. In some disclosed examples of the method, the compaction surface is parallel to the vacuum surface.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An end effector to be coupled to a robot, the end effector comprising:
    a welding head including a welder having a first central axis and a compaction foot having a second central axis, the welder being movable along the first central axis between a first retracted position and a first extended position relative to a surface of the end effector, the compaction foot circumscribing the welder and being movable along the second central axis between a second retracted position and a second extended position relative to the surface, the compaction foot including a compaction surface to compact an area of a thermoplastic part when the compaction foot is in the second extended position.

2. The end effector of claim 1, wherein the compaction foot is movable relative to the surface independently of the welder being movable relative to the surface.

3. The end effector of claim 1, wherein the compaction foot is movable relative to the welder.

4. The end effector of claim 1, wherein the second central axis is coaxially aligned with the first central axis.

5. The end effector of claim 1, wherein the second central axis is parallel to the first central axis, and the surface is oriented perpendicularly to the second central axis.

6. The end effector of claim 1, wherein the compaction surface has a circular cross-sectional shape.

7. The end effector of claim 1, wherein the area is a first area and the thermoplastic part is a first thermoplastic part positioned against a second thermoplastic part, and wherein the compaction surface is to compact the first area of the first thermoplastic part and a second area of the second thermoplastic part when the compaction foot is in the second extended position.

8. The end effector of claim 7, wherein a welding tip of the welder is to weld a first portion of the first thermoplastic part located within the first area to a second portion of the second thermoplastic part located within the second area when the welder is in the first extended position.

9. The end effector of claim 8, wherein the welding tip extends past the compaction surface when the welder is in the first extended position and the compaction foot is in the second extended position.

10. The end effector of claim 8, wherein the surface is a vacuum surface of a vacuum head, the vacuum head having an aperture circumscribing the compaction foot.

11. The end effector of claim 10, wherein the compaction surface is parallel to the vacuum surface.

12. The end effector of claim 8, wherein the welding head further includes a nozzle to direct a flow of cooling air toward the welding tip.

13. The end effector of claim 12, wherein the compaction foot circumscribes the flow of cooling air provided by the nozzle.

14. A method for welding a first thermoplastic part to a second thermoplastic part via a welding head of an end effector coupled to a robot, the method comprising:
    positioning the first thermoplastic part against the second thermoplastic part;
    positioning a surface of the end effector toward the first thermoplastic part, the welding head further including a welder having a first central axis and a compaction foot having a second central axis, the welder being movable along the first central axis between a first retracted position and a first extended position relative to the surface, the compaction foot circumscribing the welder and being movable along the second central axis between a second retracted position and a second extended position relative to the surface;
    compacting a first area of the first thermoplastic part and a second area of the second thermoplastic part by moving the compaction foot from the second retracted position to the second extended position;
    moving the welder from the first retracted position to the first extended position; and
    welding, via a welding tip of the welder, a first portion of the first thermoplastic part located within the first area to a second portion of the second thermoplastic part located within the second area, the welding to occur while the welder is in the first extended position and the compaction foot is in the second extended position.

15. The method of claim 14, wherein the moving of the welder from the first retracted position to the first extended position is to occur while the compaction foot is in the second extended position.

16. The method of claim 14, further comprising directing a flow of cooling air toward the welding tip via a nozzle of the welding head while the welder is in the first extended position, the compaction foot circumscribing the flow of cooling air provided via the nozzle.

17. The method of claim 14, further comprising returning the welder from the first extended position to the first retracted position subsequent to the welding of the first portion of the first thermoplastic part to the second portion of the second thermoplastic part.

18. The method of claim 17, further comprising directing a flow of cooling air toward the welding tip via a nozzle of the welding head subsequent to the welder being returned from the first extended position to the first retracted position, the compaction foot circumscribing the flow of cooling air provided via the nozzle.

19. The method of claim 17, further comprising maintaining the compaction foot in the second extended position subsequent to the welder being returned to the first retracted position.

20. The method of claim 14, wherein the second central axis is coaxially aligned with the first central axis.

* * * * *